(12) United States Patent
Bhaya et al.

(10) Patent No.: US 10,347,247 B2
(45) Date of Patent: Jul. 9, 2019

(54) MODULATION OF PACKETIZED AUDIO SIGNALS

(71) Applicant: Google Inc., Mountain View, CA (US)

(72) Inventors: Gaurav Bhaya, Sunnyvale, CA (US); Robert Stets, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 106 days.

(21) Appl. No.: 15/395,660

(22) Filed: Dec. 30, 2016

(65) Prior Publication Data

US 2018/0190275 A1  Jul. 5, 2018

(51) Int. Cl.

| | |
|---|---|
| *G06F 17/27* | (2006.01) |
| *G10L 15/22* | (2006.01) |
| *G10L 15/30* | (2013.01) |
| *H04L 29/06* | (2006.01) |
| *G10L 15/18* | (2013.01) |
| *G10L 21/003* | (2013.01) |
| *G10L 21/0316* | (2013.01) |
| *G10L 13/027* | (2013.01) |
| *G10L 15/08* | (2006.01) |

(52) U.S. Cl.
CPC .......... *G10L 15/22* (2013.01); *G06F 17/2705* (2013.01); *G10L 13/027* (2013.01); *G10L 15/1815* (2013.01); *G10L 15/1822* (2013.01); *G10L 15/30* (2013.01); *G10L 21/003* (2013.01); *G10L 21/0316* (2013.01); *H04L 65/1069* (2013.01); *G10L 2015/088* (2013.01); *G10L 2015/223* (2013.01)

(58) Field of Classification Search
CPC ...... G10L 15/22; G10L 15/00; G06F 17/2705
See application file for complete search history.

(56) References Cited

U.S. PATENT DOCUMENTS

| | | |
|---|---|---|
| 6,275,806 B1 | 8/2001 | Pertrushin |
| 6,684,249 B1 * | 1/2004 | Frerichs ................. G06Q 30/02 |
| | | 380/200 |
| 6,857,007 B1 | 2/2005 | Bloomfield |
| 7,590,538 B2 | 9/2009 | St. John |
| 7,853,255 B2 | 12/2010 | Karaoguz et al. |
| | (Continued) | |

OTHER PUBLICATIONS

"Amazon and Google Want to Turn Their Smart Home Speakers Into Telephone Replacements—Mac Rumors" MacRumors, 9 pages.
(Continued)

*Primary Examiner* — Samuel G Neway
(74) *Attorney, Agent, or Firm* — Foley & Lardner LLP; James De Vellis

(57) ABSTRACT

Modulating packetized audio signals in a voice activated data packet based computer network environment is provided. A system can receive audio signals detected by a microphone of a device. The system can parse the audio signal to identify trigger keyword and request, and generate a first action data structure. The system can identify a content item object based on the trigger keyword, and generate an output signal comprising a first portion corresponding to the first action data structure and a second portion corresponding to the content item object. The system can apply a modulation to the first or second portion of the output signal, and transmit the modulated output signal to the device.

20 Claims, 5 Drawing Sheets

(56) References Cited

U.S. PATENT DOCUMENTS

| | | | |
|---|---|---|---|
| 7,869,998 B1* | 1/2011 | Di Fabbrizio | G10L 13/00 704/1 |
| 8,195,133 B2 | 6/2012 | Ramer et al. | |
| 8,386,386 B1 | 2/2013 | Zhu | |
| 8,428,758 B2 | 4/2013 | Naik et al. | |
| 8,903,716 B2 | 12/2014 | Chen et al. | |
| 9,805,710 B2* | 10/2017 | Lavoie | G10L 13/0335 |
| 2005/0050093 A1* | 3/2005 | Atkin | G06F 17/3087 |
| 2005/0060158 A1* | 3/2005 | Endo | G10L 15/22 704/275 |
| 2005/0169283 A1* | 8/2005 | Jindal | H04M 3/4938 370/401 |
| 2006/0080101 A1* | 4/2006 | Chotimongkol | G06F 17/278 704/257 |
| 2006/0161278 A1 | 7/2006 | Maeda et al. | |
| 2006/0277567 A1* | 12/2006 | Kinnear | H04H 20/106 725/34 |
| 2007/0097975 A1 | 5/2007 | Rakers et al. | |
| 2007/0127688 A1 | 6/2007 | Doulton | |
| 2008/0031475 A1 | 2/2008 | Goldstein | |
| 2008/0065486 A1* | 3/2008 | Vincent | G06Q 30/02 705/14.64 |
| 2008/0312922 A1* | 12/2008 | Evenden | H04L 29/06027 704/246 |
| 2010/0010817 A1 | 1/2010 | Ramaswamy | |
| 2011/0054899 A1 | 3/2011 | Phillips et al. | |
| 2011/0135072 A1* | 6/2011 | Balentine | H04L 69/329 379/88.16 |
| 2012/0265528 A1 | 10/2012 | Gruber et al. | |
| 2012/0290290 A1* | 11/2012 | Tur | G10L 15/26 704/9 |
| 2013/0117022 A1 | 5/2013 | Chen et al. | |
| 2013/0275164 A1 | 10/2013 | Gruber et al. | |
| 2013/0275875 A1 | 10/2013 | Gruber et al. | |
| 2013/0304758 A1 | 11/2013 | Gruber et al. | |
| 2013/0317823 A1* | 11/2013 | Mengibar | G06Q 30/0277 704/251 |
| 2014/0067395 A1* | 3/2014 | Balasubramanian | G06F 17/30654 704/251 |
| 2014/0142952 A1* | 5/2014 | Kondziela | G10L 15/22 704/275 |
| 2015/0039308 A1* | 2/2015 | Kim | G06F 17/30752 704/235 |
| 2015/0201155 A1* | 7/2015 | Lee | G11B 27/28 386/250 |
| 2015/0332708 A1* | 11/2015 | Keller | G10L 25/48 704/270 |
| 2016/0077794 A1* | 3/2016 | Kim | G06F 3/167 704/275 |
| 2017/0092278 A1 | 3/2017 | Evermann et al. | |
| 2017/0110130 A1 | 4/2017 | Sharifi et al. | |
| 2017/0110144 A1 | 4/2017 | Sharifi et al. | |
| 2017/0132019 A1 | 5/2017 | Karashchuk et al. | |
| 2017/0358301 A1 | 12/2017 | Raitio et al. | |

OTHER PUBLICATIONS

"Apple Patent Reveals a New Security Feature Coming to Siri" 6 pages.
"Introducing Echo Look Hands-Free Camera and Style Assistant" 1996-2017, Amazon.com, Inc. 5 pages.
"The Patent Behind Google Home's New Feature of Understanding Different Voices in the Home Surfaced Today", Apr. 20, 2017, 5 pages.
Close, "Amazon Echo Will Give You These Deals If You Order Through Alexa This Weekend," Web Article, Nov. 18, 2016, Time. com (2 pages).
Collins, Terry "Can Twitter Save itself? The Social Network is Slowly gaining users, but still Lags Far Behind Rivals. Is a Turnaround Possible?" 3 pages.
Cook, "A Siri for advertising: These mobile ads talk back to you," Web Article, Apr. 1, 2013, Geekwire.com (7 pages).
Golgowski, Nina, "This Burger King Ad Is Trying to Control Your Google Home Device", Apr. 12, 2017, 7 pages.
Larson, Selena "Google Home Now Recognizes your Individual Voice" dated Apr. 20, 2017, 3 pages.
Nieva, Richard, "Google Home and eBay can tell you how much that's worth", 3 pages.
Purcher, Jack "Today Google Home's Virtual Assistant Can Learn its Owner's Voice for Security Reason's like Apple's Patent Pending Idea" Apr. 20, 2017, 4 pages.
Seifert, Dan "Samsung's New Virtual Assistant Will Make Using Your Phone Easier", Mar. 20, 2017, 7 pages.
Sherr, Ian "IBM Built a Voice Assistant for Cybersecurity" dated Feb. 13, 2017, 4 pages.
Siegal, Daniel, "IP Attys Load Up Apps' Legal Challenges at Silicon Beach" 6 pages.
Simonite, "How Alexa, Siri, and Google Assistant Will Make Money Off You," Web Article, May 31, 2016, technologyreview. com (11 pages).
Simonite, "How Assistant Could End Up Eating Google's Lunch," Web Article, Sep. 23, 2016, technologyreview.com (9 pages).
"Walmart and Google to offer voice-enabled shopping", BBC News, Aug. 23, 2017.
Abrams, Help users find, interact & re-engage with your app on the Google Assistant, Google Developers Blog, Nov. 15, 2017, 16 pages.
Albrecht, "Alexa, How Can You Be Used in Restaurants?", the spoon, Dec. 10, 2017, 6 pages.
Barr, "AWS DeepLens—Get Hands-On Experience with Deep Learning With Our New Video Camera", AWS News Blog, Nov. 29, 2017, 11 pages.
Broussard, Mitchel, "Chatbot-Like Siri Patent Includes Intelligent Image, Video, and Audio Recognition within Messages", MacRumors, May 11, 2017 (7 pages).
Chen, Lulu Yilun, "Alibaba Challenges Google, Amazon With New Echo-Like Device", Bloomberg Technology, Jul. 5, 2017 (3 pages).
Coberly, "Apple patent filing reveals potential whispering Siri functionality", Techspot, Dec. 14, 2017, 4 pages.
Crist, Ry, "Logitech Harmony's Alexa Skill just got a whole lot better", cnet, Jul. 13, 2017 (2 pages).
Estes, "Amazon's Newest Gadget Is a Tablet That's Also an Echo", Gizmodo, Sep. 19, 2017, 3 pages.
Foghorn Labs, 10 Tips to Improve the Performance of Google Product Listing Ads, printed from Internet address: http://www.foghornlabs.com/2012/11/21/product-listing-ads-best-practices/, on Mar. 18, 2013, 5 pages.
Forrest, Conner, "Essential Home wants to be 'bridge' between Amazon Alex, Apple's Siri, and Google Assistant", TechRepublic, May 31, 2017 (10 pages).
Foxx, Chris, "Apple reveals HomePod smart speaker", BBC News, Jun. 5, 2017 (6 pages).
Gebhart, Andrew, "Google Assistant is spreading, but it needs its own Echo Dot", cnet, May 20, 2017 (7 pages).
Gebhart, Andrew, "Google Home to the Amazon Echo: 'Anything you can do . . . '", cnet, May 18, 2017 (7 pages).
Gibbs, Samuel, "Your Facebook Messenger app is about to be filled with ads", The Guardian, Jul. 12, 2017 (3 pages).
Google Developers, "GoogleAssistant SDK" reprinted from https://developers.google.com/assistant/sdk/ on Aug. 22, 2017 (4 pages).
Google Inc., Products Feed Specification, printed from Internet address: http://www.support.google.com/merchants/bin/answer.py?hl=en&answer=188494#US, on Mar. 18, 2013, 6 pages.
Google Inc., Supported File Formats, printed from Internet address: http://www.support.google.com/merchants/bin/answer.py?hl=en&answer=160567, on Mar. 18, 2013, 1 page.
Gurman, et al., "Apple Is Manufacturing a Siri Speaker to Outdo Google and Amazon", Bloomberg, May 31, 2017 (5 pages).
Hardwick, Tim, "Facebook Smart Speaker Coming Next Year With 15-inch Touch Panel", MacRumors, Jul. 25, 2017 (5 pages).
Heater, "Amazon Alexa devices can finally tell voices apart", TechCrunch, Oct. 11, 2017, 6 pages.

(56) References Cited

OTHER PUBLICATIONS

International Search Report and Written Opinion for PCT Appl. Ser. No. PCT/US2017/049758 dated Nov. 14, 2017, 13 pages.
Johnston, "Amazon Whirlwind: New Echo, Plus, Spot, Connect, Fire TV Take the Stage", Twice, Sep. 27, 2017, 4 pages.
Kelion, "Amazon revamps Echo smart speaker family", BBC News, Sep. 27, 2017, 11 pages.
Kelion, Leo, "Amazon's race to make Alexa smarter", BBC News, Jul. 28, 2017 (8 pages).
Koetsier, John, "Ads on Amazon Echo: Wendy's, ESPN, and Progressive Among Brands Testing", Forbes, May 11, 2017 (2 pages).
Krishna, "Jim Beam's smart decanter will pour you a shot when you ask", engadget, Nov. 29, 2017, 3 pages.
Lacy, "Improving search and advertising are the next frontiers for voice-activated devices", TechCrunch, Dec. 20, 2017, 13 pages.
Lee, Take Two for Samsung's troubled Bixby assistant, BBC News, Oct. 19, 2017, 6 pages.
Lee, Dave, "The five big announcements from Google I/O", BBC News, May 18, 2017 (9 pages).
Lund, Pamela, Mastering Google Product Feeds and Product Listing Ads $2013 Part 1, found at http://www.blueglass.com/blog/mastering-google-product-feeds-and-product-listing-ads-part-1/#comments, Dec. 28, 2013, 17 pages.
Novet, et al., "Amazon is getting ready to bring Alexa to work", CNBC, Nov. 29, 2017, 4 pages.
Palladino, "Garmin teamed up with Amazon to make a tiny Echo Dot for your car", ars Technica, Oct. 17, 2017, 2 pages.
Perez, "Alexa's 'Routines' will combine smart home control with other actions, like delivering your news and weather", TechCrunch, Sep. 28, 2017, 10 pages.
Perez, Sarah, "The first ad network for Alexa Skills shuts down following Amazon's policy changes", Tech Crunch, Jun. 15, 2017 (6 pages).
Porter, Jon, "Amazon Echo Show release date, price, news and features", Techradar, Jun. 26, 2017 (14 pages).
Pringle, "'I'm sorry to hear that': Why training Siri to be a therapist won't be easy", CBC News, Sep. 24, 2017, 3 pages.
Sablich, Justin, "Planning a Trip With the Help of Google Home", New York Times, May 31, 2017 (6 pages).
Smith, Dave, "The Amazon Echo got 2 incredibly useful features thanks to a new update", Business Insider, Jun. 1, 2017 (5 pages).
Unknown Author, "'Dolphin' attacks fool Amazon, Google voice assistants", BBC News, Sep. 7, 2017, 8 pages.
Willens, Max, "For publishers, Amazon Alexa holds promise but not much money (yet)", Digiday, Jul. 6, 2017 (6 pages).
Wu, et al., "Modeling the Expressivity of Input Text Semantics for Chinese Text-to-Speech Synthesis in a Spoken Dialog System", IEEE Transactions on Audio, Speech, and Language Processing, vol. 17, No. 8, Nov. 1, 2009, pp. 1567-1576.
Wu, et al., "A Corpus-Based Approach for Cooperative Response Generation in a Dialog System", Department of Systems Engineering and Engineering Management, The Chinese University of Hong Kong, Shatin, Jan. 1, 2006, pp. 614-626.
Buckland et al., "Amazon's Alexa Takes Open-Source Route to Beat Google Into Cars", Bloomberg, Feb. 27, 2018, 6 pages.
Office Action for KR 10-2017-7031462 dated Jan. 18, 2019.

* cited by examiner

MODULATION OF PACKETIZED AUDIO SIGNALS

BACKGROUND

Excessive network transmissions, packet-based or otherwise, of network traffic data between computing devices can prevent a computing device from properly processing the network traffic data, completing an operation related to the network traffic data, or timely responding to the network traffic data. The excessive network transmissions of network traffic data can also complicate data routing or degrade the quality of the response if the responding computing device is at or above its processing capacity, which may result in inefficient bandwidth utilization. The control of network transmissions corresponding to content item objects can be complicated by the large number of content item objects that can initiate network transmissions of network traffic data between computing devices.

SUMMARY

The present disclosure is generally directed to improving the efficiency and effectiveness of information transmission over one or more interfaces or one or more types of computer networks. For example, computing systems may have access to a limited number of interfaces, limited types of interfaces, or there may a limited number of available interfaces at a given time. It may be challenging for a system to efficiently transmit information in response to the currently available interfaces because certain types of interfaces may consume greater computing resources or battery.

Systems and methods of the present disclosure are generally directed to a data processing system that dynamically modulates output audio based on the context of a communication session. The data processing system can modulate the tone, frequency, center frequency, and amplitude, apply a watermark, overlay, or otherwise modulate or adjust a portion of the output audio in order to indicate the context or type of the portion of the output audio. The data processing system can use a first audio modulation for a first portion of the output audio signal, and a second audio modulation for a second portion of the audio signal based on the context for the second portion being different than the first portion. For example, the second portion can include audio corresponding to a content item provided by a third party content provider and selected by the data processing system during a real-time selection process.

At least one aspect is directed to a system to perform dynamic modulation of packetized audio signals. The system can include a natural language processor component, interface, direct action application programming interface, content selector, and audio signal generator component executed by a data processing system. The natural language processor component can receive, via the interface, data packets comprising an input audio signal detected by a sensor of a client device. The natural language processor component can parse the input audio signal to identify a request and a trigger keyword corresponding to the request. The direct action application programming interface can generate, based on the trigger keyword, a first action data structure responsive to the request. The content selector component can receive the trigger keyword identified by the natural language processor and select, based on the trigger keyword, a content item via a real-time content selection process. The audio signal generator component can generate an output signal that includes a first portion corresponding to the first action data structure and generated with a first audio modulation, and includes a second portion corresponding to the content item and generated with a second audio modulation different from the first audio modulation. The interface of the data processing system can transmit data packets comprising the output signal generated by the audio signal generator component. The interface can transmit the data packets to cause an audio driver component executed by the client device to drive a speaker of the client device to generate an acoustic wave corresponding to the output signal.

At least one aspect is directed to a method of performing dynamic modulation of packetized audio signals. The method can include a natural language processor component executed by a data processing system receiving, via an interface of the data processing system, data packets comprising an input audio signal detected by a sensor of a client device. The method can include the natural language processor component parsing the input audio signal to identify a request and a trigger keyword corresponding to the request. The method can include a direct action application programming interface of the data processing system generating, based on the trigger keyword, a first action data structure responsive to the request. The method can include a content selector component executed by the data processing system receiving the trigger keyword identified by the natural language processor. The method can include the content selector component selecting, based on the trigger keyword, a content item via a real-time content selection process. The method can include an audio signal generator component executed by the data processing system generating an output signal comprising a first portion corresponding to the first action data structure and generated with a first audio modulation, and a second portion corresponding to the content item and generated with a second audio modulation different from the first audio modulation. The method can include the interface of the data processing system transmitting data packets comprising the output signal generated by the audio signal generator component to cause an audio driver component executed by the client device to drive a speaker of the client device to generate an acoustic wave corresponding to the output signal.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Following below are more detailed descriptions of various concepts related to, and implementations of, methods, apparatuses, and systems of modulating packetized audio signals. The various concepts introduced above and discussed in greater detail below may be implemented in any of numerous ways.

The present disclosure is generally directed a data processing system for performing dynamic modulation of packetized audio signals. The data processing system can improve the efficiency and effectiveness of information transmission over one or more interfaces or one or more types of computer networks. For example, computing systems may have access to a limited number of interfaces, limited types of interfaces, or there may a limited number of available interfaces at a given time. It may be challenging for a system to efficiently transmit information in response to the currently available interfaces because certain types of interfaces may consume greater computing resources or battery.

Systems and methods of the present disclosure are generally directed to a data processing system that dynamically modulates output audio based on the context of a communication session. The data processing system can modulate the tone, frequency, center frequency, and amplitude, apply a watermark, overlay, or otherwise modulate or adjust a portion of the output audio in order to indicate the context or type of the portion of the output audio. The data processing system can use a first audio modulation for a first portion of the output audio signal, and a second audio modulation for a second portion of the audio signal based on the context for the second portion being different than the first portion. For example, the second portion can include audio corresponding to a content item provided by a third party content provider and selected by the data processing system during a real-time selection process.

The present solution can reduce resource consumption, processor utilization, battery consumption, bandwidth utilization, size of an audio file, or amount of time consumed by a speaker by modulating a portion of an output audio file to provide an indication. In some cases, the data processing system can modulate the portion of the audio file instead of appending an additional audio content to the audio file. By modulating the portion of the audio file, the data processing system can reduce resource consumption by providing fewer data transmissions or generating fewer audio signals as compared to providing a separate indication appended to the audio file or provided in a separate manner.

Figure 1:
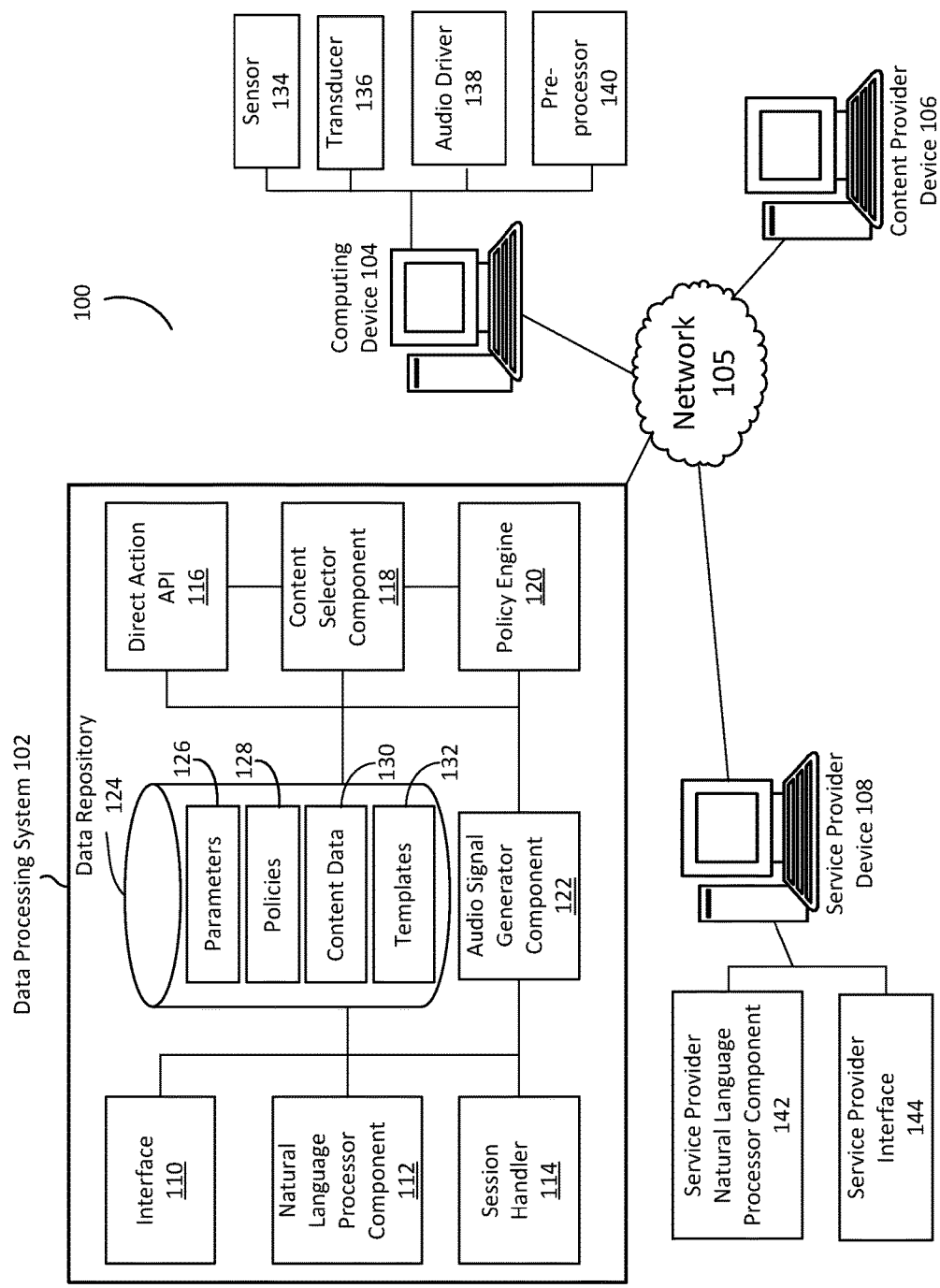
FIG. 1 is an illustration of a system to modulate packetized audio signals.

FIG. 1 illustrates an example system 100 to perform dynamic modulation of packetized audio signals. The system 100 can include content selection infrastructure. The system 100 can include a data processing system 102. The data processing system 102 can communicate with one or more of a content provider computing device 106, service provider computing device 108, or client computing device 104 via a network 105. The network 105 can include computer networks such as the Internet, local, wide, metro, or other area networks, intranets, satellite networks, and other communication networks such as voice or data mobile telephone networks. The network 105 can be used to access information resources such as web pages, web sites, domain names, or uniform resource locators that can be presented, output, rendered, or displayed on at least one computing device 104, such as a laptop, desktop, tablet, personal digital assistant, smart phone, portable computers, or speaker. For example, via the network 105 a user of the computing device 104 can access information or data provided by a service provider 108 or content provider 106. The computing device 104 may or may not include a display; for example, the computing device may include limited types of user interfaces, such as a microphone and speaker. In some cases, the primary user interface of the computing device 104 may be a microphone and speaker.

The network 105 can include or constitute a display network, e.g., a subset of information resources available on the internet that are associated with a content placement or search engine results system, or that are eligible to include third party content items as part of a content item placement campaign. The network 105 can be used by the data processing system 102 to access information resources such as web pages, web sites, domain names, or uniform resource locators that can be presented, output, rendered, or displayed by the client computing device 104. For example, via the network 105 a user of the client computing device 104 can access information or data provided by the content provider computing device 106 or the service provider computing device 108.

The network 105 may be any type or form of network and may include any of the following: a point-to-point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. The network 105 may include a wireless link, such as an infrared channel or satellite band. The topology of the network 105 may include a bus, star, or ring network topology. The network may include mobile telephone networks using any protocol or protocols used to communicate among mobile devices, including advanced mobile phone protocol ("AMPS"), time division multiple access ("TDMA"), code-division multiple access ("CDMA"), global system for mobile communication ("GSM"), general packet radio services ("GPRS") or universal mobile telecommunications system ("UMTS"). Different types of data may be transmitted via different protocols, or the same types of data may be transmitted via different protocols.

The system 100 can include at least one data processing system 102. The data processing system 102 can include at least one logic device such as a computing device having a processor to communicate via the network 105, for example with the computing device 104, the content provider device 106 (content provider 106), or the service provider device 108 (or service provider 108). The data processing system 102 can include at least one computation resource, server, processor or memory. For example, the data processing system 102 can include a plurality of computation resources or servers located in at least one data center. The data processing system 102 can include multiple, logically-grouped servers and facilitate distributed computing techniques. The logical group of servers may be referred to as a data center, server farm or a machine farm. The servers can also be geographically dispersed. A data center or machine farm may be administered as a single entity, or the machine farm can include a plurality of machine farms. The servers within each machine farm can be heterogeneous—one or more of the servers or machines can operate according to one or more type of operating system platform.

Servers in the machine farm can be stored in high-density rack systems, along with associated storage systems, and located in an enterprise data center. For example, consolidating the servers in this way may improve system manageability, data security, the physical security of the system, and system performance by locating servers and high performance storage systems on localized high performance networks. Centralization of all or some of the data processing system 102 components, including servers and storage systems, and coupling them with advanced system management tools allows more efficient use of server resources, which saves power and processing requirements and reduces bandwidth usage.

The system 100 can include, access, or otherwise interact with at least one service provider device 108. The service provider device 108 can include at least one logic device such as a computing device having a processor to communicate via the network 105, for example with the computing device 104, the data processing system 102, or the content provider 106. The service provider device 108 can include at least one computation resource, server, processor or memory. For example, service provider device 108 can include a plurality of computation resources or servers located in at least one data center. The service provider device 108 can include one or more component or functionality of the data processing system 102.

The content provider computing device 106 can provide audio based content items for display by the client computing device 104 as an audio output content item. The content item can include an offer for a good or service, such as a voice based message that states: "Would you like me to order you a taxi?" For example, the content provider computing device 155 can include memory to store a series of audio content items that can be provided in response to a voice based query. The content provider computing device 106 can also provide audio based content items (or other content items) to the data processing system 102 where they can be stored in the data repository 124. The data processing system 102 can select the audio content items and provide (or instruct the content provider computing device 104 to provide) the audio content items to the client computing device 104. The audio based content items can be exclusively audio or can be combined with text, image, or video data.

The service provider device 108 can include, interface, or otherwise communicate with at least one service provider natural language processor component 142 and a service provider interface 144. The service provider computing device 108 can include at least one service provider natural language processor (NLP) component 142 and at least one service provider interface 144. The service provider NLP component 142 (or other components such as a direct action API of the service provider computing device 108) can engage with the client computing device 104 (via the data processing system 102 or bypassing the data processing system 102) to create a back-and-forth real-time voice or audio based conversation (e.g., a session) between the client computing device 104 and the service provider computing device 108. The service provider NLP 142 can include one or more function or feature as the NLP component 112 of the data processing system 102. For example, the service provider interface 144 can receive or provide data messages to the direct action API 116 of the data processing system 102.

The service provider computing device 108 and the content provider computing device 106 can be associated with the same entity. For example, the content provider computing device 106 can create, store, or make available content items for a car sharing service, and the service provider computing device 108 can establish a session with the client computing device 106 to arrange for a delivery of a taxi or car of the car share service to pick up the end user of the client computing device 104. The data processing system 102, via the direct action API 116, the NLP component 112 or other components can also establish the session with the client computing device, including or bypassing the service provider computing device 104, to arrange for example for a delivery of a taxi or car of the car share service.

The computing device 104 can include, interface, or otherwise communicate with at least one sensor 134, transducer 136, audio driver 138, or pre-processor 140. The sensor 134 can include, for example, an ambient light sensor, proximity sensor, temperature sensor, accelerometer, gyroscope, motion detector, GPS sensor, location sensor, microphone, or touch sensor. The transducer 136 can include a speaker or a microphone. The audio driver 138 can provide a software interface to the hardware transducer 136. The audio driver can execute the audio file or other instructions provided by the data processing system 102 to control the transducer 136 to generate a corresponding acoustic wave or sound wave. The pre-processor 140 can be configured to detect a keyword and perform an action based on the keyword. The pre-processor 140 can filter out one or more terms or modify the terms prior to transmitting the terms to the data processing system 102 for further processing. The pre-processor 140 can convert the analog audio signals detected by the microphone into a digital audio signal, and transmit one or more data packets carrying the digital audio signal to the data processing system 102 via the network 105. In some cases, the pre-processor 140 can transmit data packets carrying some or all of the input audio signal responsive to detecting an instruction to perform such transmission. The instruction can include, for example, a trigger keyword or other keyword or approval to transmit data packets comprising the input audio signal to the data processing system 102.

The client computing device 104 can be associated with an end user that enters voice queries as audio input into the client computing device 104 (via the sensor 134) and receives audio output in the form of a computer generated voice that can be provided from the data processing system 102 (or the content provider computing device 106 or the service provider computing device 108) to the client computing device 104, output from the transducer 136 (e.g., a speaker). The computer generated voice can include recordings from a real person or computer generated language.

The data repository 124 can include one or more local or distributed databases, and can include a database management system. The data repository 124 can include computer data storage or memory and can store one or more parameters 126, one or more policies 128, content data 130, or templates 132 among other data. The parameters 126, policies 128, and templates 132 can include information such as rules about a voice based session between the client computing device 104 and the data processing system 102 (or the service provider computing device 108). The content data 130 can include content items for audio output or associated metadata, as well as input audio messages that can be part of one or more communication sessions with the client computing device 104.

The data processing system 102 can include a content placement system having at least one computation resource or server. The data processing system 102 can include, interface, or otherwise communicate with at least one interface 110. The data processing system 102 can include, interface, or otherwise communicate with at least one natural language processor component 112. The data processing system 102 can include, interface, or otherwise communicate with at least one session handler 114. The data processing system 102 can include, interface, or otherwise communicate with at least one direct action application programming interface ("API") 116. The data processing system 102 can include, interface, or otherwise communicate with at least one content selector component 118. The data processing system 102 can include, interface, or otherwise communicate with at least one policy engine 120. The data processing system 102 can include, interface, or otherwise communicate with at least one audio signal generator 122. The data processing system 102 can include, interface, or otherwise communicate with at least one data repository 124. The at least one data repository 124 can include or store, in one or more data structures or databases, parameters 126, policies 128, content data 130, or templates 132. Parameters 126 can include, for example, thresholds, distances, time intervals, durations, scores, or weights. Content data 130 can include, for example, content campaign information, content groups, content selection criteria, content item objects or other information provided by a content provider 106 or obtained or determined by the data processing system to facilitate content selection. The content data 130 can include, for example, historical performance of a content campaign.

The interface 110, natural language processor component 112, session handler 114, direct action API 116, content selector component 118, policy engine 120, or audio signal generator component 122 can each include at least one processing unit or other logic device such as programmable logic array engine, or module configured to communicate with the database repository or database 124. The interface 110, natural language processor component 112, session handler 114, direct action API 116, content selector component 118, policy engine 120, audio signal generator component 122 and data repository 124 can be separate components, a single component, or part of the data processing system 102. The system 100 and its components, such as a data processing system 102, can include hardware elements, such as one or more processors, logic devices, or circuits.

The data processing system 102 can obtain anonymous computer network activity information associated with a plurality of computing devices 104. A user of a computing device 104 can affirmatively authorize the data processing system 102 to obtain network activity information corresponding to the user's computing device 104. For example, the data processing system 102 can prompt the user of the computing device 104 for consent to obtain one or more types of network activity information. The identity of the user of the computing device 104 can remain anonymous and the computing device 104 can be associated with a unique identifier (e.g., a unique identifier for the user or the computing device provided by the data processing system or a user of the computing device). The data processing system can associate each observation with a corresponding unique identifier.

A content provider 106 can establish an electronic content campaign. The electronic content campaign can be stored as content data 130 in data repository 124. An electronic content campaign can refer to one or more content groups that correspond to a common theme. A content campaign can include a hierarchical data structure that includes content groups, content item data objects, and content selection criteria. To create a content campaign, content provider 106 can specify values for campaign level parameters of the content campaign. The campaign level parameters can include, for example, a campaign name, a preferred content network for placing content item objects, a value of resources to be used for the content campaign, start and end dates for the content campaign, a duration for the content campaign, a schedule for content item object placements, language, geographical locations, type of computing devices on which to provide content item objects. In some cases, an impression can refer to when a content item object is fetched from its source (e.g., data processing system 102 or content provider 106), and is countable. In some cases, due to the possibility of click fraud, robotic activity can be filtered and excluded, as an impression. Thus, in some cases, an impression can refer to a measurement of responses from a Web server to a page request from a browser, which is filtered from robotic activity and error codes, and is recorded at a point as close as possible to opportunity to render the content item object for display on the computing device 104. In some cases, an impression can refer to a viewable or audible impression; e.g., the content item object is at least partially (e.g., 20%, 30%, 30%, 40%, 50%, 60%, 70%, or more) viewable on a display device of the client computing device 104, or audible via a speaker 136 of the computing device 104. A click or selection can refer to a user interaction with the content item object, such as a voice response to an audible impression, a mouse-click, touch interaction, gesture, shake, audio interaction, or keyboard click. A conversion can refer to a user taking a desired action with respect to the content item objection; e.g., purchasing a product or service, completing a survey, visiting a physical store corresponding to the content item, or completing an electronic transaction.

The content provider 106 can further establish one or more content groups for a content campaign. A content group includes one or more content item objects and corresponding content selection criteria, such as keywords, words, terms, phrases, geographic locations, type of computing device, time of day, interest, topic, or vertical. Content groups under the same content campaign can share the same campaign level parameters, but may have tailored specifications for particular content group level parameters, such as keywords, negative keywords (e.g., that block placement of the content item in the presence of the negative keyword on main content), bids for keywords, or parameters associated with the bid or content campaign.

To create a new content group, the content provider can provide values for the content group level parameters of the content group. The content group level parameters include, for example, a content group name or content group theme, and bids for different content placement opportunities (e.g., automatic placement or managed placement) or outcomes (e.g., clicks, impressions, or conversions). A content group name or content group theme can be one or more terms that the content provider 106 can use to capture a topic or subject matter for which content item objects of the content group is to be selected for display. For example, a car dealership can create a different content group for each brand of vehicle it carries, and may further create a different content group for each model of vehicle it carries. Examples of the content group themes that the car dealership can use include, for example, "Make A sports car" "Make B sports car," "Make C sedan," "Make C truck," "Make C hybrid," or "Make D hybrid." An example content campaign theme can be "hybrid" and include content groups for both "Make C hybrid" and "Make D hybrid", for example.

The content provider 106 can provide one or more keywords and content item objects to each content group. Keywords can include terms that are relevant to the product or services of associated with or identified by the content item objects. A keyword can include one or more terms or phrases. For example, the car dealership can include "sports car," "V-6 engine," "four-wheel drive," "fuel efficiency," as keywords for a content group or content campaign. In some cases, negative keywords can be specified by the content provider to avoid, prevent, block, or disable content placement on certain terms or keywords. The content provider can specify a type of matching, such as exact match, phrase match, or broad match, used to select content item objects.

The content provider 106 can provide one or more keywords to be used by the data processing system 102 to select a content item object provided by the content provider 106. The content provider 106 can identify one or more keywords to bid on, and further provide bid amounts for various keywords. The content provider 106 can provide additional content selection criteria to be used by the data processing system 102 to select content item objects. Multiple content providers 106 can bid on the same or different keywords, and the data processing system 102 can run a content selection process or ad auction responsive to receiving an indication of a keyword of an electronic message.

The content provider 106 can provide one or more content item objects for selection by the data processing system 102. The data processing system 102 (e.g., via content selector component 118) can select the content item objects when a content placement opportunity becomes available that matches the resource allocation, content schedule, maximum bids, keywords, and other selection criteria specified for the content group. Different types of content item objects can be included in a content group, such as a voice content item, audio content item, a text content item, an image content item, video content item, multimedia content item, or content item link. Upon selecting a content item, the data processing system 102 can transmit the content item object for rendering on a computing device 104 or display device of the computing device 104. Rendering can include displaying the content item on a display device, or playing the content item via a speaker of the computing device 104. The data processing system 102 can provide instructions to a computing device 104 to render the content item object. The data processing system 102 can instruct the computing device 104, or an audio driver 138 of the computing device 104, to generate audio signals or acoustic waves.

The data processing system 102 can include an interface component 110 designed, configured, constructed, or operational to receive and transmit information using, for example, data packets. The interface 110 can receive and transmit information using one or more protocols, such as a network protocol. The interface 110 can include a hardware interface, software interface, wired interface, or wireless interface. The interface 110 can facilitate translating or formatting data from one format to another format. For example, the interface 110 can include an application programming interface that includes definitions for communicating between various components, such as software components.

The data processing system 102 can include an application, script or program installed at the client computing device 104, such as an app to communicate input audio signals to the interface 110 of the data processing system 102 and to drive components of the client computing device to render output audio signals. The data processing system 102 can receive data packets or other signal that includes or identifies an audio input signal. For example, the data processing system 102 can execute or run the NLP component 112 to receive or obtain the audio signal and parse the audio signal. For example, the NLP component 112 can provide for interactions between a human and a computer. The NLP component 112 can be configured with techniques for understanding natural language and allowing the data processing system 102 to derive meaning from human or natural language input. The NLP component 112 can include or be configured with technique based on machine learning, such as statistical machine learning. The NLP component 112 can utilize decision trees, statistical models, or probabilistic models to parse the input audio signal. The NLP component 112 can perform, for example, functions such as named entity recognition (e.g., given a stream of text, determine which items in the text map to proper names, such as people or places, and what the type of each such name is, such as person, location, or organization), natural language generation (e.g., convert information from computer databases or semantic intents into understandable human language), natural language understanding (e.g., convert text into more formal representations such as first-order logic structures that a computer module can manipulate), machine translation (e.g., automatically translate text from one human language to another), morphological segmentation (e.g., separating words into individual morphemes and identify the class of the morphemes, which can be challenging based on the complexity of the morphology or structure of the words of the language being considered), question answering (e.g., determining an answer to a human-language question, which can be specific or open-ended), semantic processing (e.g., processing that can occur after identifying a word and encoding its meaning in order to relate the identified word to other words with similar meanings).

The NLP component 112 converts the audio input signal into recognized text by comparing the input signal against a stored, representative set of audio waveforms (e.g., in the data repository 124) and choosing the closest matches. The set of audio waveforms can be stored in data repository 124 or other database accessible to the data processing system 102. The representative waveforms are generated across a large set of users, and then may be augmented with speech samples from the user. After the audio signal is converted into recognized text, the NLP component 112 matches the text to words that are associated, for example via training across users or through manual specification, with actions that the data processing system 102 can serve.

The audio input signal can be detected by the sensor 134 or transducer 136 (e.g., a microphone) of the client computing device 104. Via the transducer 136, the audio driver 138, or other components the client computing device 104 can provide the audio input signal to the data processing system 102 (e.g., via the network 105) where it can be received (e.g., by the interface 110) and provided to the NLP component 112 or stored in the data repository 124.

The NLP component 112 can obtain the input audio signal. From the input audio signal, the NLP component 112 can identify at least one request or at least one trigger keyword corresponding to the request. The request can indicate intent or subject matter of the input audio signal. The trigger keyword can indicate a type of action likely to be taken. For example, the NLP component 112 can parse the input audio signal to identify at least one request to leave home for the evening to attend dinner and a movie. The trigger keyword can include at least one word, phrase, root or partial word, or derivative indicating an action to be taken. For example, the trigger keyword "go" or "to go to" from the input audio signal can indicate a need for transport. In this example, the input audio signal (or the identified request) does not directly express an intent for transport, however the trigger keyword indicates that transport is an ancillary action to at least one other action that is indicated by the request.

The NLP component 112 can parse the input audio signal to identify, determine, retrieve, or otherwise obtain the request and the trigger keyword. For instance, the NLP component 112 can apply a semantic processing technique to the input audio signal to identify the trigger keyword or the request. The NLP component 112 can apply the semantic processing technique to the input audio signal to identify a trigger phrase that includes one or more trigger keywords, such as a first trigger keyword and a second trigger keyword. For example, the input audio signal can include the sentence "I need someone to do my laundry and my dry cleaning." The NLP component 112 can apply a semantic processing technique, or other natural language processing technique, to the data packets comprising the sentence to identify trigger phrases "do my laundry" and "do my dry cleaning". The NLP component 112 can further identify multiple trigger keywords, such as laundry, and dry cleaning. For example, the NLP component 112 can determine that the trigger phrase includes the trigger keyword and a second trigger keyword.

The NLP component 112 can filter the input audio signal to identify the trigger keyword. For example, the data packets carrying the input audio signal can include "It would be great if I could get someone that could help me go to the airport", in which case the NLP component 112 can filter out one or more terms as follows: "it", "would", "be", "great", "if", "I", "could", "get", "someone", "that", "could", or "help". By filtering out these terms, the NLP component 112 may more accurately and reliably identify the trigger keywords, such as "go to the airport" and determine that this is a request for a taxi or a ride sharing service.

In some cases, the NLP component can determine that the data packets carrying the input audio signal includes one or more requests. For example, the input audio signal can include the sentence "I need someone to do my laundry and my dry cleaning." The NLP component 112 can determine this is a request for a laundry service and a dry cleaning service. The NLP component 112 can determine this is a single request for a service provider that can provide both laundry services and dry cleaning services. The NLP component 112 can determine that this is two requests; a first request for a service provider that performs laundry services, and a second request for a service provider that provides dry cleaning services. In some cases, the NLP component 112 can combine the multiple determined requests into a single request, and transmit the single request to a service provider device 108. In some cases, the NLP component 112 can transmit the individual requests to respective service provider devices 108, or separately transmit both requests to the same service provider device 108.

The data processing system 102 can include a direct action API 116 designed and constructed to generate, based on the trigger keyword, a first action data structure responsive to the request. Processors of the data processing system 102 can invoke the direct action API 116 to execute scripts that generate a data structure to a service provider device 108 to request or order a service or product, such as a car from a car share service. The direct action API 116 can obtain data from the data repository 124, as well as data received with end user consent from the client computing device 104 to determine location, time, user accounts, logistical or other information to allow the service provider device 108 to perform an operation, such as reserve a car from the car share service. Using the direct action API 116, the data processing system 102 can also communicate with the service provider device 108 to complete the conversion by in this example making the car share pick up reservation.

The direct action API 116 can receive an instruction or command from the NLP component 112, or other component of the data processing system 102, to generate or construct the first action data structure. The direct action API 116 can determine a type of action in order to select a template from the template repository 132 stored in the data repository 124. Types of actions can include, for example, services, products, reservations, or tickets. Types of actions can further include types of services or products. For example, types of services can include car share service, food delivery service, laundry service, maid service, repair services, or household services. Types of products can include, for example, clothes, shoes, toys, electronics, computers, books, or jewelry. Types of reservations can include, for example, dinner reservations or hair salon appointments. Types of tickets can include, for example, movie tickets, sports venue tickets, or flight tickets. In some cases, the types of services, products, reservations or tickets can be categorized based on price, location, type of shipping, availability, or other attributes.

The direct action API 116 can execute a specified action to satisfy the end user's intention, as determined by the data processing system 102. Depending on the action specified in its inputs, the direct action API 116 can execute code or a dialog script that identifies the parameters required to fulfill a user request. Such code can look-up additional information, e.g., in the data repository 124, such as the name of a home automation service, or it can provide audio output for rendering at the client computing device 104 to ask the end user questions such as the intended destination of a requested taxi. The direct action API 116 can determine necessary parameters and can package the information into an action data structure, which can then be sent to another component such as the content selector component 118 or to the service provider computing device 108 to be fulfilled.

The direct action API 116, upon identifying the type of request, can access the corresponding template from the template repository 132. Templates can include fields in a structured data set that can be populated by the direct action API 116 to further the operation that is requested of the service provider device 108 (such as the operation of sending a taxi to pick up an end user at a pickup location and transport the end user to a destination location). The fields can be populated with numerical values, character strings, Unicode values, Boolean logic, binary values, hexadecimal values, identifiers, location coordinates, geographic areas, timestamps, or other values. The fields or the data structure itself can be encrypted or masked to maintain data security.

The direct action API 116 can perform a look-up or other query operation on the template repository 132 to select the template that matches one or more characteristic of the trigger keyword and request. For example, if the request corresponds to a request for a car or ride to a destination, the data processing system 102 can select a car sharing service template. The car sharing service template can include one or more of the following fields: device identifier, pick up location, destination location, number of passengers, or type of service. The direct action API 116 can populate the fields with values. To populate the fields with values, the direct action API 116 can ping, poll or otherwise obtain information from one or more sensors 134 of the computing device 104 or a user interface of the device 104. For example, the direct action API 116 can detect the source location using a location sensor, such as a GPS sensor. The direct action API 116 can obtain further information by submitting a survey, prompt, or query to the end of user of the computing device 104. The direct action API can submit the survey, prompt, or query via interface 110 of the data processing system 102 and a user interface of the computing device 104 (e.g., audio interface, voice-based user interface, display, or touch screen). Thus, the direct action API 116 can select a template for the first action data structure based on the trigger keyword or the request, populate one or more fields in the template with information detected by one or more sensors 134 or obtained via a user interface, and generate, create or otherwise construct the first action data structure to facilitate performance of an operation by the service provider device 108.

The data processing system 102 can include, execute, or otherwise communicate with a content selector component 118 to receive the trigger keyword identified by the natural language processor and select, based on the trigger keyword, a content item via a real-time content selection process. The content selection process can refer to, or include, selecting sponsored content item objects provided by third party content providers 106. The real-time content selection process can include a service in which content items provided by multiple content providers are parsed, processed, weighted, or matched in order to select one or more content items to provide to the computing device 104. The content selector component 118 can perform the content selection process in real-time. Performing the content selection process in real-time can refer to performing the content selection process responsive to the request for content received via the client computing device 104. The real-time content selection process can be performed (e.g., initiated or completed) within a time interval of receiving the request (e.g., 5 seconds, 10 seconds, 20 seconds, 30 seconds, 1 minute, 2 minutes, 3 minutes, 5 minutes, 10 minutes, or 20 minutes). The real-time content selection process can be performed during a communication session with the client computing device 104, or within a time interval after the communication session is terminated.

For example, the data processing system 102 can include a content selector component 118 designed, constructed, configured or operational to select content item objects. To select content items for display in a voice-based environment, the data processing system 102 (e.g., via NLP component 112) can parse the input audio signal to identify keywords (e.g., a trigger keyword), and use the keywords to select a matching content item based on a broad match, exact match, or phrase match. For example, the content selector component 118 can analyze, parse, or otherwise process subject matter of candidate content items to determine whether the subject matter of the candidate content items correspond to the subject matter of the keywords or phrases of the input audio signal detected by the microphone of the client computing device 104. The content selector component 118 may identify, analyze, or recognize voice, audio, terms, characters, text, symbols, or images of the candidate content items using an image processing technique, character recognition technique, natural language processing technique, or database lookup. The candidate content items may include metadata indicative of the subject matter of the candidate content items, in which case the content selector component 118 may process the metadata to determine whether the subject matter of the candidate content item corresponds to the input audio signal.

Content providers 106 may provide additional indicators when setting up a content campaign that includes content items. The content provider may provide information at the content campaign or content group level that the content selector component 118 may identify by performing a lookup using information about the candidate content item. For example, the candidate content item may include a unique identifier, which may map to a content group, content campaign, or content provider. The content selector component 118 may determine, based on information stored in content campaign data structure in data repository 124, information about the content provider 106.

The data processing system 102 can receive, via a computer network, a request for content for presentation on a computing device 104. The data processing system 102 can identify the request by processing an input audio signal detected by a microphone of the client computing device 104. The request can include selection criteria of the request, such as the device type, location, and a keyword associated with the request.

Responsive to the request, the data processing system 102 can select a content item object from data repository 124 or a database associated with the content provider 106, and provide the content item for presentation via the computing device 104 via network 105. The computing device 104 can interact with the content item object. The computing device 104 can receive an audio response to the content item. The computing device 104 can receive an indication to select a hyperlink or other button associated with the content item object that causes or allows the computing device 104 to identify service provider 108, request a service from the service provider 108, instruct the service provider 108 to perform a service, transmit information to the service provider 108, or otherwise query the service provider device 108.

The data processing system 102 can include, execute, or communicate with an audio signal generator component 122 to generate an output signal. The output signal can include one or more portions. For example, the output signal can include a first portion and a second portion. The first portion of the output signal can correspond to the first action data structure. The second portion of the output signal can correspond to the content item selected by the content selector component 118 during the real-time content selection process.

The audio signal generator component 122 can generate the output signal with a first portion having sound corresponding to the first data structure. For example, the audio signal generator component 122 can generate the first portion of the output signal based on one or more values populated into the fields of the first action data structure by the direct action API 116. In a taxi service example, the values for the fields can include, for example, 123 Main Street for pick-up location, 1234 Main Street for destination location, 2 for number of passengers, and economy for the level of service. The audio signal generator component 122 can generate the first portion of the output signal in order to confirm that the end user of the computing device 104 wants to proceed with transmitting the request to the service provider 108. The first portion can include the following output "Would you like to order an economy car from taxi service provider A to pick two people up at 123 Main Street and drop off at 1234 Main Street?"

In some cases, the first portion can include information received from the service provider device 108. The information received from service provider device 108 can be customized or tailored for the first action data structure. For example, the data processing system 102 (e.g., via direct action API 116) can transmit the first action data structure to the service provider 108 before instructing the service provider 108 to perform the operation. Instead, the data processing system 102 can instruct the service provider device 108 to perform initial or preliminary processing on the first action data structure to generate preliminary information about the operation. In the example of the taxi service, the preliminary processing on the first action data structure can include identifying available taxis that meet the level of service requirement that are located around the pick-up location, estimating an amount of time for the nearest available taxi to reach the pick-up location, estimating a time of arrival at the destination, and estimating a price for the taxi service. The estimated preliminary values may include a fixed value, an estimate that is subject to change based on various conditions, or a range of values. The service provider device 108 can return the preliminary information to the data processing system 102 or directly to the client computing device 104 via the network 104. The data processing system 102 can incorporate the preliminary results from the service provider device 108 into the output signal, and transmit the output signal to the computing device 104. The output signal can include, for example, "Taxi Service Company A can pick you up at 123 Main Street in 10 minutes, and drop you off at 1234 Main Street by 9 AM for $10. Do you want to order this ride?" This can form the first portion of the output signal.

In some cases, the data processing system 102 can form a second portion of the output signal. The second portion of the output signal can include a content item selected by the content selector component 118 during a real-time content selection process. The first portion can be different from the second portion. For example, the first portion can include information corresponding to the first action data structure that is directly responsive to the data packets carrying the input audio signal detected by the sensor 134 of the client computing device 104, whereas the second potion can include a content item selected by a content selector component 104 that can be tangentially relevant to the first action data structure, or include sponsored content provided by a content provider device 106. For example, the end user of the computing device 104 can request a taxi from Taxi Service Company A. The data processing system 102 can generate the first portion of the output signal to include information about the taxi from the Taxi Service Company A. However, the data processing system 102 can generate the second portion of the output signal to include a content item selected based on the keywords "taxi service" and information contained in the first action data structure that the end user may be interested in. For example, the second portion can include a content item or information provided by a different taxi service company, such as Taxi Service Company B. While the user may not have specifically requested Taxi Service Company B, the data processing system 102 may nonetheless provide a content item from Taxi Service Company B because the user may choose to perform an operation with Taxi Service Company B.

The data processing system 102 can transmit information from the first action data structure to the Taxi Service Company B to determine a pick-up time, time of arrival at the destination, and a price for the ride. The data processing system 102 can receive this information and generate the second portion of the output signal as follows: "Taxi Service Company B can pick you up at 123 Main Street in 2 minutes, and drop you off at 1234 Main Street by 8:52 AM for $15. Do you want this ride instead?" The end user of computing device 104 can then select the ride provided by Taxi Service Company A or the ride provided by Taxi Service Company B.

Prior to providing, in the second portion of the output signal, the sponsored content item corresponding to the service provided by Taxi Service Company B, the data processing system 102 can notify the end user computing device that the second portion corresponds to a content item object selected during a real-time content selection process (e.g., by the content selector component 118). However, the data processing system 102 can have limited access to different types of interfaces to provide the notification to the end user of the computing device 104. For example, the computing device 104 may not include a display device, or the display device may be disabled or turned off. The display device of the computing device 104 may consume greater resources than the speaker of the computing device 104, so it may be less efficient to turn on the display device of the computing device 104 as compared to using the speaker of the computing device 104 to convey the notification. Thus, in some cases, the data processing system 102 can improve the efficiency and effectiveness of information transmission over one or more interfaces or one or more types of computer networks. For example, the data processing system 102 (e.g., via the audio signal generator component 122) can module the portion of the output audio signal comprising the content item to provide the indication or notification the end user that that portion of the output signal comprises the sponsored content item.

The audio signal generator component 122 can generate the output signal using one or more audio modulation techniques. An audio modulation technique can include, for example, a frequency shift, amplitude shift, an audio overlay, or an audio watermark. The audio modulation technique can include, in some cases, applying a modulation or changing a portion of the original output signal, or not changing or modulating the original audio signal (e.g., the absence of change or modulation to a portion of the original output signal).

The data processing system 102 can generate the first portion of the output signal with a first audio modulation. The data processing system 102 can generate the second portion of the output signal with a second audio modulation. The first audio modulation can be different from the second audio modulation in order to indicate that the first portion of the output signal is of a different type than the second portion of the output signal. For example, the first audio modulation of the first portion of the output signal can indicate that the first portion is an organic result or directly responsive to the end user's input audio signal. The second audio modulation of the second portion of the output signal can indicate that the second portion is a sponsored content item selected by a content selector during a real-time content selection process.

The first audio modulation can include a default audio modulation. The default audio modulation can, in some cases, refer to not modulating the sound. For example, the default modulation can refer to a zero frequency shift, no pitch shift, no change in amplitude, or no audio watermark. In some case, the first portion can be modulated by decreasing or increasing the pitch, frequency, tone, amplitude (e.g., volume), or applying an audio watermark.

The audio signal generator component 122 can modulate at least a portion of the output signal by shifting a frequency of the portion of the output signal. The audio signal generator component 122 can increase or decrease a frequency of the portion of the output signal. The audio signal generator component 122 can increase the frequency of the output signal to generate a resulting output signal with a higher frequency, tone, or pitch as compared to the original output signal. The audio signal generator component 122 can decrease the frequency of the output signal to generate a resulting output signal with a lower frequency, tone, or pitch as compared to the original output signal. The audio signal generator component can adjust the bass or treble of the output signal.

The audio signal generator component 122 can include a mixer or a frequency mixer. A mixer can refer to a nonlinear electrical circuit that creates new frequencies from two signals applied to it. For example, two signals at frequencies f1 and f2 can be applied to a mixer, and the mixer can produce new signals at the sum f1+f2 and difference f1−f2 of the original frequencies, called heterodynes.

The audio signal generator component 122 can include a pitch shifter, pitch bender or auto tuner that can raise or lower the pitch of the sound recorded in at least a portion of the output signal. The pitch shifter can refer to a sound effects unit that raises or lowers the pitch of an audio signal by a preset or predetermined interval. For example, the pitch shifter set to increase the pitch by a fourth can raise each note three diatonic intervals above the notes actually played. The pitch shifter can raise or lower the pitch by one or two octaves, or a range of interval alterations. The pitch shifter can include a harmonizer that combines the "shifted" pitch with the original pitch to create a two or more note harmony.

In some cases, the output signal can include a digital recording. The audio signal generator component 122 can perform pitch shifting on the digital recording through digital signal processing. The audio signal generator 122 can shift the pitch values in post-production or in real-time. For example, the audio signal generator component 122 can generate the output signal with the pitch shifted portion, and transmit data packets including the output signal with the pitch shifted values to the client computing device 104 for playback. In some cases, the audio signal generator component 122 can transmit the output signal with instructions to the client computing device 104 to shift the pitch values in real-time during playback. The client computing device 104 can receive data packets carrying the output signal in the payload as well as instructions to shift the pitch values up or down, and the amount to shift the pitch. The client computing device 104 can receive the output signal and pitch instructions from the data processing system 102 (e.g., via network 105). The client computing device 104 (e.g., via the audio driver 138) can shift the frequency of the potion of the output signal as the speaker (e.g., 136) of the client computing device 102 plays the sound.

The audio signal generator component 122 can include an amplifier to increase the amplitude of the output. The audio signal generator component 122 can apply digital signal processing techniques to increase the amplitude of at least a portion of the output signal. The audio signal generator component 122 can transmit instructions to the audio driver 138 to increase the amplitude of at least a portion of the sound generated by the transducer 136 or speaker. The audio signal generator component 122 can generate an audio file comprising one or more types of modulations to one or more portions of the output signal.

The audio signal generator component 122 can apply an audio watermark to at least a portion of the output signal. An audio watermarking can refer to the process of embedding information into a signal (e.g. audio signal) in a way that is difficult to remove. For example, the watermark can be applied across the frequency spectrum such that removing the watermark would distort the original audio signal to an extent where the original audio signal is not desirable or suitable. If the signal is copied, then the information is also carried in the copy. The audio watermark can include an identifier, unique identifier, or other signal or information that is difficult to remove. In some cases, the audio watermark can be applied across the frequency spectrum of the output signal. The audio watermark can include a signal within the auditory frequency range (e.g., 20 Hz to 20,000 Hz).

The audio signal generator component 122 can apply an audio overlay to at least a portion of the output signal. The audio overlay can include a tone, note, phrase, instrumental, beat, or other audio overlay. The audio overlay can have a same or different amplitude as the portion of the output signal. For example, the audio overlay can be perceived by the end user of the computing device 104 to be a background audio or sound. The audio overlay can include statements such as "This content item provided by content provider".

Thus, by modulating a portion of the output corresponding to the content item, the data processing system 102 (e.g., via the audio signal generator component 122) can efficiency transmit additional information about the content item via the audio interface. The original content item can be modulated. The original content item may not include an indication, or auditory indication, that the content item corresponds to a sponsored content item. The data processing system 102 can modulate the portion corresponding to the content item since the original content item may not include such notification or indication. Modulating the original content item may be more efficient or an improvement over adding an additional audio clip to the auditory content item as that can require additional data transmission, occupy additional speaker resources and battery resources, additional processing resources, and otherwise occupy a time interval greater than the original auditory content item.

The data processing system 102 (e.g., via interface 110 and network 105) can transmit data packets comprising the output signal generated by the audio signal generator component 122. The output signal can cause the audio driver component 138 of or executed by the client device 104 to drive a speaker (e.g., transducer 136) of the client device 104 to generate an acoustic wave corresponding to the output signal.

The data processing system 102 can include, access, execute or otherwise communicate with a policy engine component 120 to determine, based on the content item selected via the real-time content selection process, to instruct the audio signal generator component 122 to apply a modulation to at least a portion of the output signal. The policy engine component 120 can determine, for example, to apply a modulation to the second portion of the output signal, and to not modulate the first portion of the output signal. The policy engine component 120 can determine, for example, to apply the first modulation to the first portion of the output signal, and the second modulation different from the first modulation to the second portion of the output signal.

The policy engine component 120 can include or utilize one or more rules, decision trees, heuristic techniques, or machine learning techniques to determine to modulate a portion of the output signal, and the type of modulation. For example, the policy engine component 120 can utilize a rule that instructs to apply a modulation to a portion of the output signal corresponding to a content item, and not modulate a portion of the output signal corresponding to the first action data structure. The policy engine component 120 can utilize a rule that instructs to apply a first modulation to the first portion of the output signal that includes or corresponds to the first action data structures, and apply a second modulation to the second portions of the output signal that includes or corresponds to the content item object selected by the content selector component 118 during the real-time content selection process.

The policy engine component 120 can include or utilize one or more rules. The rules can be stored in data repository 124 in a policies data structure 128. Rules can include if/then statements, conditional statements, event driven rules, location-based rules, or Boolean logic. Rules can include, for example, to modulate the portion if it corresponds to a content item provided by a content item provider device 106; modulate the portion if it corresponds to the content item and the content item has not previously been provided to the computing device 104; modulate the portion if it corresponds to the content item and the content item has not previously been provided to the computing device 104 during a time interval (e.g., the last 10 minutes; the last 30 minutes; the last 1 hour; the last 2 hours; the last 4 hours; the last 8 hours; the last 24 hours; the last 72 hours, or more); modulate the portion if it corresponds to the content item and the content item has not previously been provided to the computing device 104 during a communication session (e.g., a conversational session as determined by the session handler 114); modulate the portion if it has not been previously presented to the computing device 104 while the computing device 104 was located at a current location or other predetermined location; or modulate the portion if it has not been previously presented to the computing device 104 while the computing device 104 was located at a current location or other predetermined location during the time interval.

For example, if the computing device 104 was located at 123 Main Street and received the second portion of the output signal modulated with the second modulation to indicate that it corresponds to a content item object selected by the content selector component 118 during a real-time content selection process, then the policy engine component 120 can determine, based on a rule selected or retrieved from the policies data structure 128 stored in data repository 124, to not apply the second modulation if the second portion is being provided to the computing device 104 while it is at the same location as a previous time when the content item was presented to the computing device 104, and within 15 minutes of when the content item was previously presented to the computing device 104.

The data processing system 102 can include, execute, access, or otherwise communicate with a session handler component 114 to establish a communication session between the client device 104 and the data processing system 102. The communication session can refer to one or more data transmissions between the client device 104 and the data processing system 102 that includes the input audio signal that is detected by a sensor 134 of the client device 104, and the output signal transmitted by the data processing system 102 to the client device 104. The data processing system 102 (e.g., via the session handler component 114) can establish the communication session responsive to receiving the input audio signal. The session handler 114 can assign a unique identifier to the communication session. For example, the data processing system can generate the unique identifier for the communication session based on a tuple formed from a plurality of values such as a timestamp corresponding to when the communication session was established, a unique identifier of the communication session, time and date stamp of the communication session, and identifier of the service provider device. The data processing system 102 can set a duration for the communication session. The data processing system 102 can set a timer or a counter for the duration set for the communication session. Responsive to expiration of the timer, the data processing system 102 can terminate the communication session.

The communication session can refer to a network-based communication session in which the client device 104 provides authenticating information or credentials to establish the session. In some cases, the communication session refers to a topic or a context of audio signals carried by data packets during the session. For example, a first communication session can refer to audio signals transmitted between the client device 104 and the data processing system 102 that are related to (e.g., include keywords, first action data structures, or content item objects) a taxi service; and a second communication session can refer to audio signals transmitted between the client device 104 and data processing system 102 that are related to a laundry and dry cleaning service. In this example, the data processing system 102 can determine that the context of the audio signals are different (e.g., via the NLP component 112), and separate the two sets of audio signals into different communication sessions. The session handler 114 can terminate the first session related to the ride service responsive to identifying one or more audio signals related to the dry cleaning and laundry service. Thus, the data processing system 102 can initiate or establish the second session for the audio signals related to the dry cleaning and laundry service responsive to detecting the context of the audio signals.

The session handler 114 can detect a transition from a first type of network activity (e.g., taxi service) that occurred in the communication session to a second type of network activity (e.g., laundry service). The session handler 114 can terminate, responsive to the transition, the communication session. The session handler 114 can establish a second communication session between the client device and the data processing system. The second communication session can include the second type of network activity (e.g., laundry service) and a second input audio signal (e.g., a request for the laundry service).

The session handler 114 can initiate, establish, or terminate communication sessions using various parameters stored in a parameter data structure 126 or policies stored in policies data structure 128. Parameters can include, for example, time intervals, location boundaries, distances, relevancy scores, semantic vector distances, number of audio signals or back-and-forth communications between the client device 104 and the data processing system 102, a number of words transmitted between the data processing system 102 and the client device 104, or a number of sentences or queries transmitted between the data processing system 102 and the client device 104. Policies can include, for example, to terminate a communication session responsive to a condition, event or trigger that can be set based on a parameter. For example, the policy can include terminating the communication session responsive to the client device 104 leaving a location based boundary defined as 100 meters around the location of the user when the communication session was established.

While modulating portions of the output signal corresponding to the content item object can reduce resource consumption as compared to providing an additional audio or video notification in addition to the content item, the data processing system 102 (e.g., via policy engine component 120 and session handler component 114) can further reduce resource consumption by determining not to modulate the portion of the output signal corresponding to the content item if the content item selected via the real-time content selection process was previously presented to the client device during the communication session. Since the content item was previously presented during the same communication session, the data processing system 102 can determine that it is not necessary to provide the same indication via modulation, and forgo the modulation, thereby avoiding the resource consumption by the audio signal generator component 122 to apply a modulation technique (e.g., a pitch shift, amplitude change, audio overlay or audio watermark).

However, if the data processing system 102 determines that the content item was not previously provided to the client device 104 during the communication session, the data processing system 102 can instruct, responsive to the content item not previously provided during the communication session, the audio signal generator component 122 to generate the second portion of the output signal with the second audio modulation different from the first audio modulation.

In some cases, the communication session can include multiple input audio signals detected by the microphone of the client computing device 104. The content selector component 118 can select, based on a second input audio signal, a second content item. The data processing system 102 (e.g., via the policy engine component 120) can determine whether to apply a modulation technique to a portion of the output signal corresponding to the second content item. For example, the policy engine 120 can determine that the second content item is different from one or more content items previously selected and provided for the client device during the communication session. The content item can be different if it is for a different service or product, or provided by a different content provider device 106. Since the second content item is different from the first content item, the data processing system 102 can determine to provide an indication by modulating the audio output corresponding to the second content item. To reduce resource consumption, the data processing system 102 may not modulate the output if the second content item matches or is similar to a content previously provided during the communication session (e.g., for the same service or product or provided by the same content provider device 108).

In the event the second content item is different from some or all of the content items previously presented during the communication session, the data processing system 102 can instruct the audio signal generator component 122 to generate a second output signal comprising a third portion corresponding to the second content item selected by the content selector component. The audio signal generator component 122 can generate the third portion generated with the same modulation used to generate the second portion of the output signal corresponding to the first content item, or a different modulation.

In some cases, the data processing system 102 can determine that the second content item corresponds to at least one content item previously selected during the communication session, and instruct, responsive to the one or more content items previously provided during the communication session, the audio signal generator component 122 to generate an output signal comprising a portion corresponding to the second content item and generated with the first audio modulation used on the first portion corresponding to the data structure. For example, the data processing system 102 can determine, in this case, not to distinguish the second content item from the first portion corresponding to the data structure and, therefore, apply the same modulation technique or default modulation technique (e.g., no modulation).

In some cases, the data processing system can mark or flag the communication session as containing sponsored content items. Subsequent to flagging the communication session as containing at least one sponsored content item, the data processing system can determine to modulate some or all output signals provide during the flagged communication session. The data processing system can un-flag the communication session based on a time interval or responsive to the data processing system providing an organic result or non-sponsored item. The data processing system can un-flag the communication session based on a change in context of the communication session. Once the communication has been un-flagged, the data processing system can stop modulating the output audio signals. The data processing system can modulate audio signals corresponding to a single sponsored content item or multiple sponsored content items.

Figure 2:
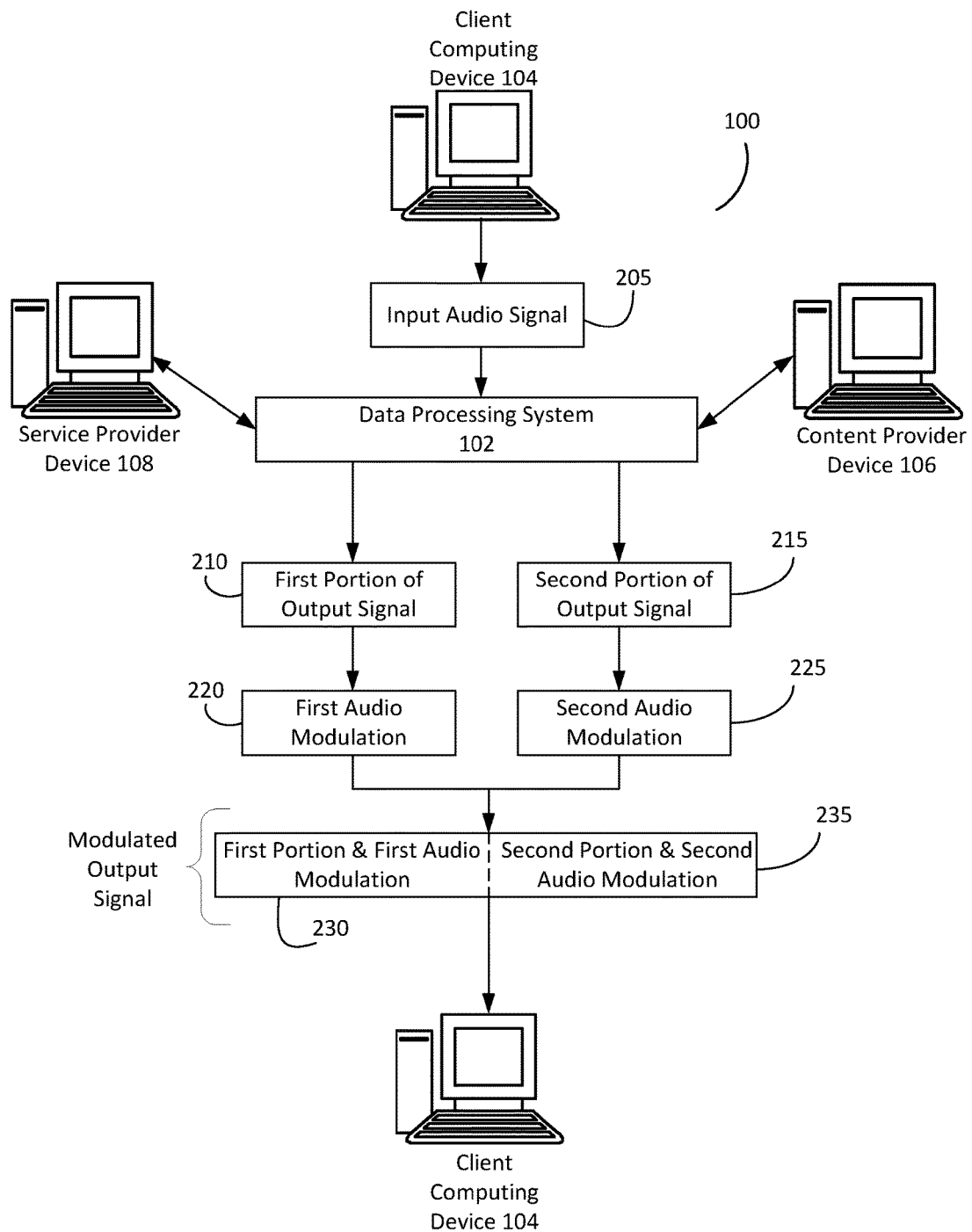
FIG. 2 is an illustration of an operation of a system to modulate packetized audio signals.

FIG. 2 is an illustration of the system 100 to modulate packetized audio signals. The system can include one or more component of system 100 depicted in FIG. 1. At 205, the client computing device 104 can transmit data packets carrying the input audio signal detected by a microphone or other sensor of the computing device 104. The client computing device 104 can transmit the input audio signal to the data processing system 102. The data processing system 102 can communicate or otherwise interface with the service provider device 108 and the content provider device 106 to generate the first portion of the output signal at 210, and generate the second portion of the output signal at 215. The first portion of the output signal can correspond to a first action data structure responsive to the input audio signal. The first portion of the output signal can include information or otherwise be associated with the service provider device 108. For example, the first portion of the output signal can include a query to confirm the request in the input audio signal. The second portion of the output signal can include a content item object provided by the content provider device 106. The content item object can be selected by the data processing system 102 during a real-time content selection process that is based on one or more keywords of the input audio signal received at 205. At 220, the data processing system 102 can further apply a first audio modulation to the first portion of the output signal, and a second audio modulation to the second portion of the output signal at 225. At 230 and 235, the data processing system 102 can merge, combine, stitch together or otherwise juxtapose the first portion of the output signal with the first modulation and the second portion of the output signal with the second modulation into a modulated output signal (which can be referred to as the output signal). The data processing system 102 can generate an audio file with the first portion and the second portion for transmission to the client computing device 104. The data processing system 102 can stream the modulated output signal to the client computing device 104 to cause the client computing device 104 to play the output signal.

Figure 3:
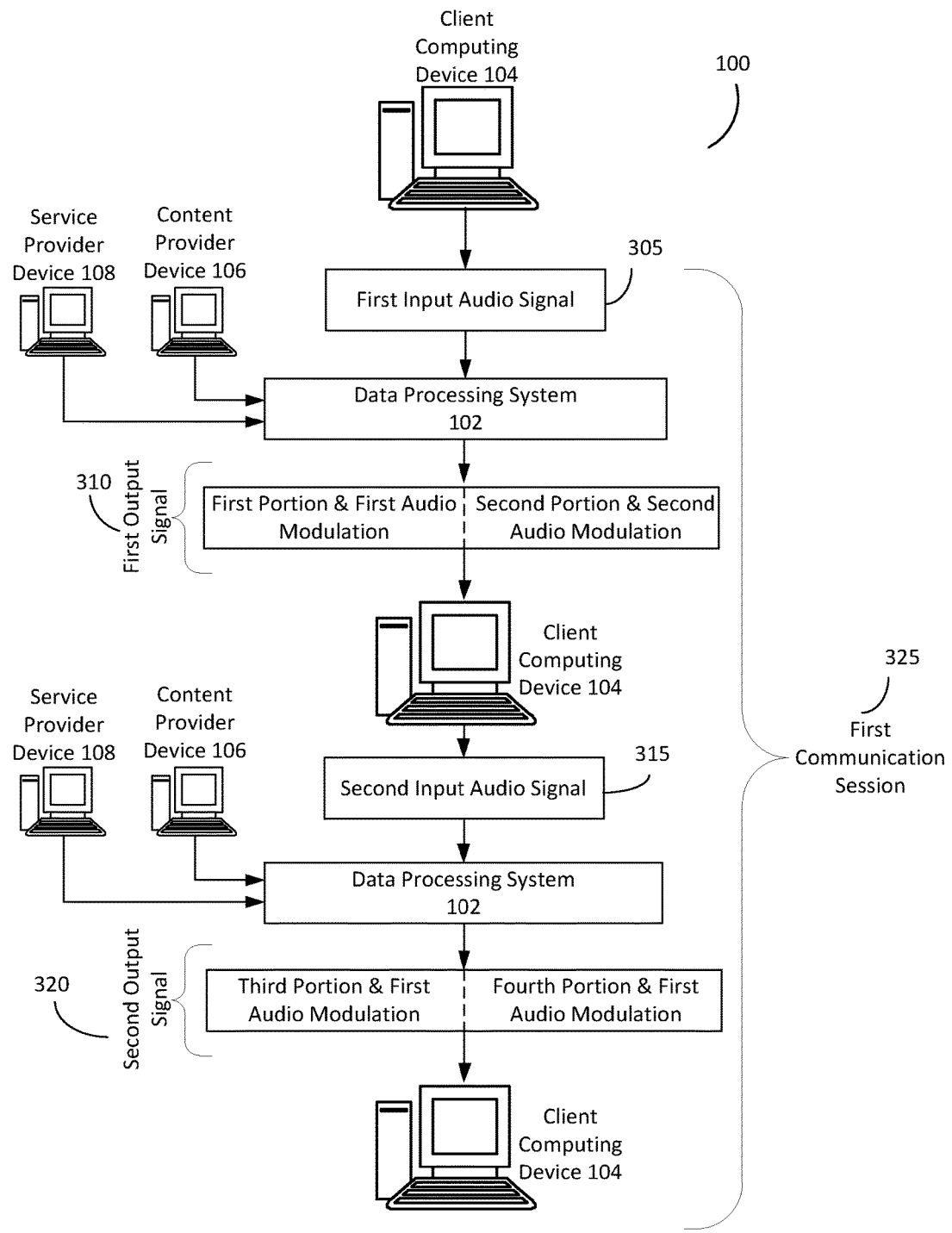
FIG. 3 is an illustration of an operation of a system to modulate packetized audio signals.

FIG. 3 is an illustration of the system 100 to modulate packetized audio signals. The system can include one or more component of system 100 depicted in FIG. 1. At 305, the client computing device 104 can transmit a first input audio signal to the data processing system 102. The first input audio signal can be detected by a microphone of the client computing device 104. The data processing system 102 can establish a first communication session 325 responsive to receiving the first input audio signal. The data processing system 102 can communicate with a service provider device 108 and a content provider device 106 to generate a first output signal at 310. The first output signal can include a first portion with a first modulation that corresponds to the service provider 108 that provides a service that is responsive to the input audio signal. The first output signal can include a second portion with a second audio modulation that corresponds to a content item object provided by the content provider device 106, and selected by the data processing system 102 during a real-time content selection process. The data processing system 102 can transmit the first output signal to the client computing device 104 via a network.

At 315, the data processing system 102 can receive a second input audio signal from the client computing device 104. The data processing system 104 can parse the second input audio signal and determine that the second input audio signal belongs in the first communication session 325. For example, the session handler of the data processing system 102 can determine to maintain the first communication session or not terminate the first communication session. The data processing system 102 can interact with the service provider device 108 and the content provider device 106 to generate a second output signal at 320. The second output signal can include a third portion with the first audio modulation. The third portion can correspond to the service provider device 108. The second output signal can include a fourth portion with the first audio modulation. The fourth portion can correspond to a content item object provided by the content provider device 106. The data processing system 102 can apply the first modulation to the fourth portion because the data processing system 102 can determine that a content item from the content provider device 106 was previously provided to the client computing device 104 during the same communication session 325. Thus, the data processing system 102 can reduce resource utilization by not modulating the fourth portion of the second output signal because the data processing system 102 can determine that a modulation-based indication of the content item was previously provided in the same communication session. The data processing system 102 can then transmit data packets carrying the second output signal to the client computing device 104.

For example, the data processing system can include an intelligent personal assistant or voice-based digital assistant. An end user can verbally ask the data processing system what the weather is. The data processing system can respond via audio with the weather information in a first portion of an auditory output signal. Thus, the first portion can include an organic result or response to the user's query. Appended to the first portion of the auditory signal, the data processing system can provide a sponsored content item selected during a content selection process. The data processing system can modulate the audio of the second portion to indicate that the second portion contains a sponsored content item. The sponsored content item can be an audio content item for a ride sharing service, for example.

Figure 4:
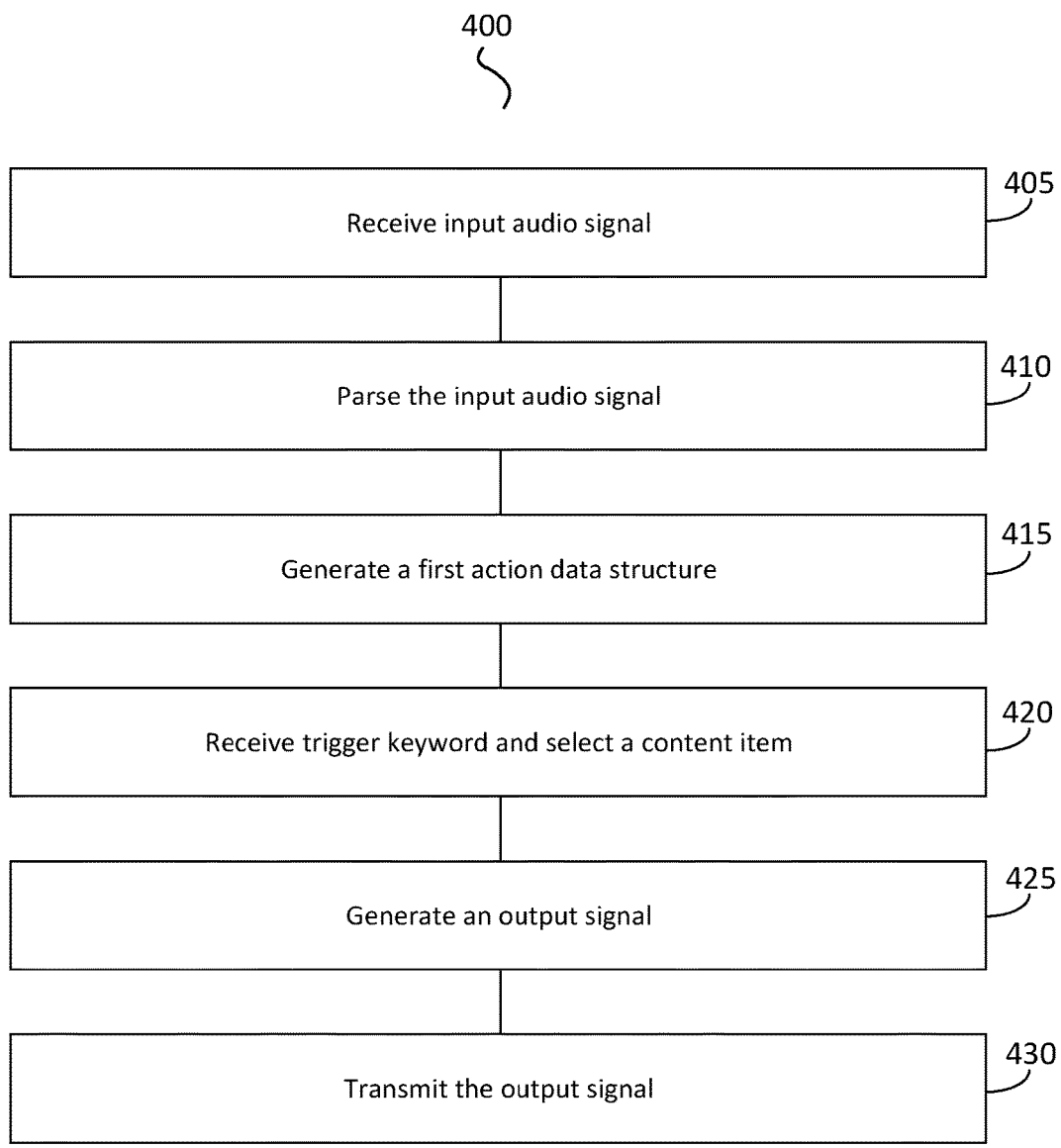
FIG. 4 is an illustration of a method of performing dynamic modulation of packetized audio signals, in accordance with an implementation.

FIG. 4 is an illustration of an example method for performing dynamic modulation of packetized audio signals. The method 400 can be performed by one or more component, system or element of system 100 or system 500.

The method 400 can include a data processing system receiving an input audio signal (ACT 405). The data processing system can receive the input audio signal from a client computing device. For example, a natural language processor component executed by the data processing system can receive the input audio signal from a client computing device via an interface of the data processing system. The data processing system can receive data packets that carry or include the input audio signal detected by a sensor of the client computing device (or client device).

At ACT 410, the method 400 can include the data processing system parsing the input audio signal. The natural language processor component can parse the input audio signal to identify a request and a trigger keyword corresponding to the request. For example, the audio signal detected by the client device can include "Okay device, I need a ride from Taxi Service Company A to go to 1234 Main Street." In this audio signal, the initial trigger keyword can include "okay device", which can indicate to the client device to transmit an input audio signal to the data processing system. A pre-processor of the client device can filter out the terms "okay device" prior to sending the remaining audio signal to the data processing system. In some cases, the client device can filter out additional terms or generate keywords to transmit to the data processing system for further processing.

The data processing system can identify a trigger keyword in the input audio signal. The trigger keyword can include, for example, "to go to" or "ride" or variations of these terms. The trigger keyword can indicate a type of service or product. The data processing system can identify a request in the input audio signal. The request can be determined based on the terms "I need". The trigger keyword and request can be determined using a semantic processing technique or other natural language processing technique.

At ACT 415, the method 400 can include the data processing system generating a first action data structure. The data processing system can generate the first action data structure based on the trigger keyword. The first action data structure can be responsive to the request. For example, if the end user of the client computing device requests a taxi from Taxi Service Company A, the first action data structure can include information to request a taxi service from Taxi Service Company A. The data processing system can select a template for Taxi Service Company A, and populate fields in the template with values to allow the Taxi Service Company A to send a taxi to the user of the client computing device to pick up the user and transport the user to the requested destination.

At ACT 420, the method 400 can include the data processing system receiving the trigger keyword and selecting a content item object. The data processing system can receive the trigger keyword identified by the natural language processor. The data processing system can select, based on the trigger keyword, a content item via a real-time content selection process. The content item object can be provided by a content provider. The content item object can be provided by a content provider that is different from the service provider device to which the data processing system transmits the first action data structure. The data processing system can select the content item object from a content provider that is different than the service provider requested by the use of the client device in the input audio signal. For example, the user can request a taxi service from Taxi Service Company A, but the content item object selected by the data processing system during the real-time content selection process can be from Taxi Service Company B.

At ACT 425, the method 400 can include the data processing system generating an output signal comprising a first portion corresponding to the first action data structure and a second portion corresponding to the content item. In some cases, the first portion may not be modulated, while the second portion is modulated. In some cases, the first portion and the second portion are modulated with different modulations in order to distinguish the first portion from the second portion. For example, the data processing system can lower the pitch of the first portion and increase the pitch of the second portion; the data processing system can increase the volume of the first portion and decrease the volume of the second portion; the data processing system can increase the volume of the first portion and increase the pitch of the second portion; or the data processing system can increase the pitch of the first portion and apply an audio overlay or watermark to the second portion.

At ACT 430, the method 400 can include the data processing system transmitting the output signal the client computing device. The data processing system can transmit data packets comprising the output signal generated by the audio signal generator component to cause an audio driver component executed by the client device to drive a speaker of the client device to generate an acoustic wave corresponding to the output signal.

Figure 5:
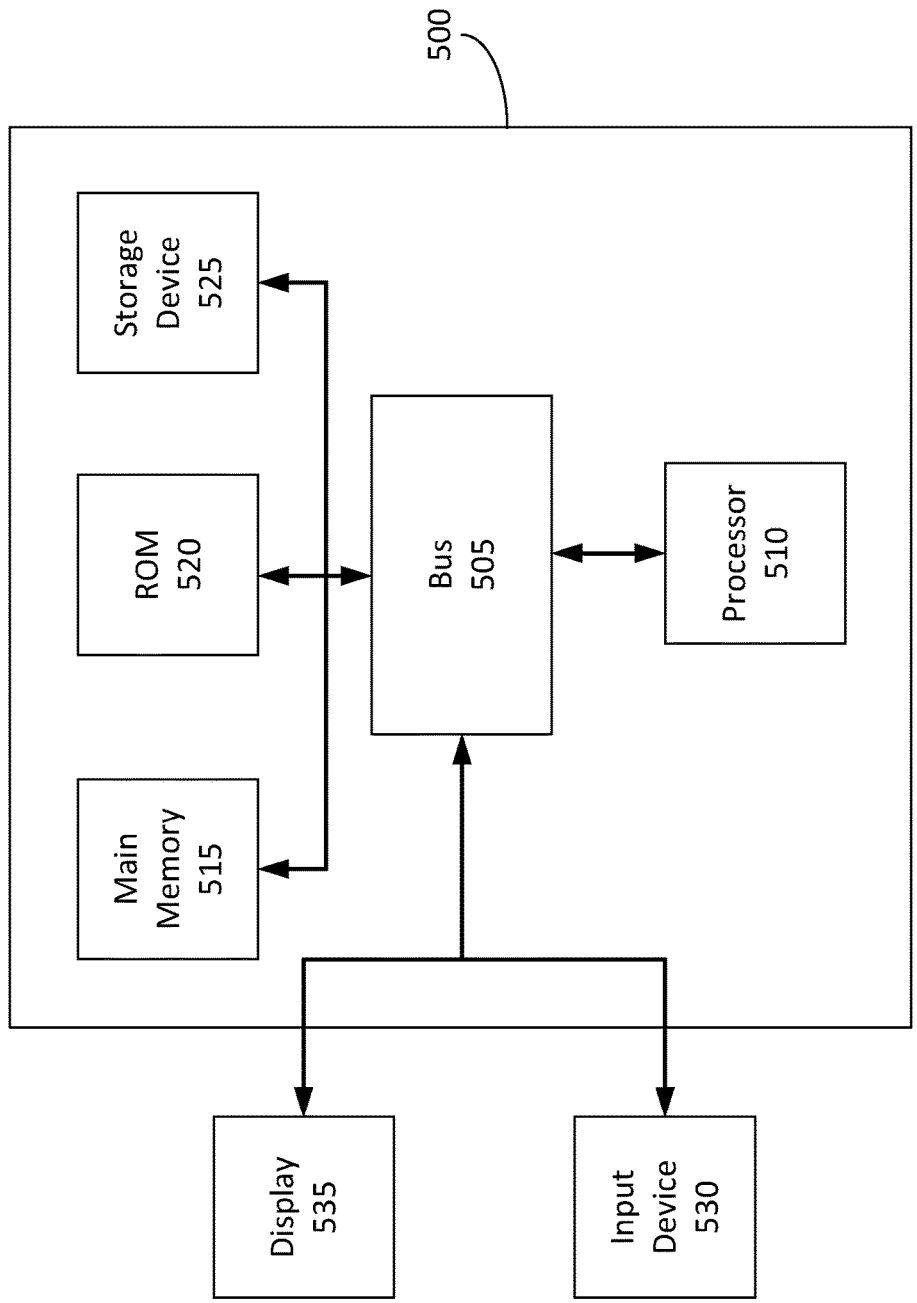
FIG. 5 is a block diagram illustrating a general architecture for a computer system that can be employed to implement elements of the systems and methods described and illustrated herein.

FIG. 5 is a block diagram of an example computer system 500. The computer system or computing device 500 can include or be used to implement the system 100, or its components such as the data processing system 102. The computing system 500 includes a bus 505 or other communication component for communicating information and a processor 510 or processing circuit coupled to the bus 505 for processing information. The computing system 500 can also include one or more processors 510 or processing circuits coupled to the bus for processing information. The computing system 500 also includes main memory 515, such as a random access memory (RAM) or other dynamic storage device, coupled to the bus 505 for storing information, and instructions to be executed by the processor 510. The main memory 515 can be or include the data repository 145. The main memory 515 can also be used for storing position information, temporary variables, or other intermediate information during execution of instructions by the processor 510. The computing system 500 may further include a read only memory (ROM) 520 or other static storage device coupled to the bus 505 for storing static information and instructions for the processor 510. A storage device 525, such as a solid state device, magnetic disk or optical disk, can be coupled to the bus 505 to persistently store information and instructions. The storage device 525 can include or be part of the data repository 145.

The computing system 500 may be coupled via the bus 505 to a display 535, such as a liquid crystal display, or active matrix display, for displaying information to a user. An input device 530, such as a keyboard including alphanumeric and other keys, may be coupled to the bus 505 for communicating information and command selections to the processor 510. The input device 530 can include a touch screen display 535. The input device 530 can also include a cursor control, such as a mouse, a trackball, or cursor direction keys, for communicating direction information and command selections to the processor 510 and for controlling cursor movement on the display 535. The display 535 can be part of the data processing system 102, the client computing device 150 or other component of FIG. 1, for example.

The processes, systems and methods described herein can be implemented by the computing system 500 in response to the processor 510 executing an arrangement of instructions contained in main memory 515. Such instructions can be read into main memory 515 from another computer-readable medium, such as the storage device 525. Execution of the arrangement of instructions contained in main memory 515 causes the computing system 500 to perform the illustrative processes described herein. One or more processors in a multi-processing arrangement may also be employed to execute the instructions contained in main memory 515. Hard-wired circuitry can be used in place of or in combination with software instructions together with the systems and methods described herein. Systems and methods described herein are not limited to any specific combination of hardware circuitry and software.

Although an example computing system has been described in FIG. 5, the subject matter including the operations described in this specification can be implemented in other types of digital electronic circuitry, or in computer software, firmware, or hardware, including the structures disclosed in this specification and their structural equivalents, or in combinations of one or more of them.

For situations in which the systems discussed herein collect personal information about users, or may make use of personal information, the users may be provided with an opportunity to control whether programs or features that may collect personal information (e.g., information about a user's social network, social actions or activities, a user's preferences, or a user's location), or to control whether or how to receive content from a content server or other data processing system that may be more relevant to the user. In addition, certain data may be anonymized in one or more ways before it is stored or used, so that personally identifiable information is removed when generating parameters. For example, a user's identity may be anonymized so that no personally identifiable information can be determined for the user, or a user's geographic location may be generalized where location information is obtained (such as to a city, postal code, or state level), so that a particular location of a user cannot be determined. Thus, the user may have control over how information is collected about him or her and used by the content server.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices). The operations described in this specification can be implemented as operations performed by a data processing apparatus on data stored on one or more computer-readable storage devices or received from other sources.

The terms "data processing system" "computing device" "component" or "data processing apparatus" encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures. The direct action API 135, content selector component 125, prediction component 120 or NLP component 110 and other data processing system 102 components can include or share one or more data processing apparatuses, systems, computing devices, or processors.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs (e.g., components of the data processing system 102) to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The subject matter described herein can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or a combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system such as system 100 or system 500 can include clients and servers. A client and server are generally remote from each other and typically interact through a communication network (e.g., the network 165). The relationship of client and server arises by virtue of computer programs running on the respective computers and having a client-server relationship to each other. In some implementations, a server transmits data (e.g., data packets representing a content item) to a client device (e.g., for purposes of displaying data to and receiving user input from a user interacting with the client device). Data generated at the client device (e.g., a result of the user interaction) can be received from the client device at the server (e.g., received by the data processing system 102 from the computing device 150 or the content provider computing device 155 or the service provider computing device 160).

While operations are depicted in the drawings in a particular order, such operations are not required to be performed in the particular order shown or in sequential order, and all illustrated operations are not required to be performed. Actions described herein can be performed in a different order.

The separation of various system components does not require separation in all implementations, and the described program components can be included in a single hardware or software product. For example, the NLP component 112 or the content selector component 118, can be a single component, app, or program, or a logic device having one or more processing circuits, or part of one or more servers of the data processing system 102.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. For example, the data processing system 102 can select a content item for a subsequent action (e.g., for the third action 215) based in part on data from a prior action in the sequence of actions of the thread 200, such as data from the second action 210 indicating that the second action 210 is complete or about to begin. The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. A system to modulate packetized audio signals, comprising:
   a natural language processor component executed by a data processing system to receive, via an interface of the data processing system, data packets comprising an input audio signal detected by a sensor of a client device;
   the natural language processor component to parse the input audio signal to identify a request and a trigger keyword corresponding to the request;
   a session handler component executed by the data processing system to establish a communication session between the client device and the data processing system, the communication session comprising the input audio signal;
   a direct action application programming interface of the data processing system to generate, based on the trigger keyword, a first action data structure responsive to the request, the first action data structure corresponding to a first type of content;
   a content selector component executed by the data processing system to receive the trigger keyword identified by the natural language processor component and select, based on the trigger keyword, a content item via a real-time content selection process, the content item corresponding to a second type of content different from the first type of content;
   an audio signal generator component executed by the data processing system to generate an output signal comprising a first portion corresponding to the first action data structure and generated with a first audio modulation, and a second portion corresponding to the content item and generated with a second audio modulation different from the first audio modulation;
   the interface of the data processing system to transmit data packets comprising the output signal generated by the audio signal generator component to cause an audio driver component executed by the client device to drive a speaker of the client device to generate an acoustic wave corresponding to the output signal;
   the content selector component to select, for the communication session comprising the input audio signal, an additional content item via the real-time content selection process, the additional content item corresponding to the second type of content different from the first type of content;
   a policy engine component executed by the data processing system to:
      determine that the additional content item corresponds to the content item previously selected via the real-time content selection process during the communication session;
      instruct, responsive to the determination that the additional content item corresponds to the content item previously selected during the communication session, the audio signal generator component to generate an additional output signal comprising an additional portion corresponding to the additional content item of the second type of content selected by the content selector component, the additional portion generated with the first audio modulation previously used to generate the first portion corresponding to the first action data structure instead of the second audio modulation previously used to generate the second portion corresponding to the content item of the second type of content; and
   the interface to transmit, within the communication session and to the client device, data packets comprising the additional output signal.

2. The system of claim 1, comprising:
the natural language processor component to apply a semantic processing technique to the input audio signal to identify a trigger phrase comprising the trigger keyword and a second trigger keyword.

3. The system of claim 1, comprising:
the natural language processor component to filter the input audio signal to identify the trigger keyword.

4. The system of claim 1, comprising:
the policy engine component executed by the data processing system to determine, based on the content item selected via the real-time content selection process, to instruct the audio signal generator component to use the second audio modulation different from the first audio modulation.

5. The system of claim 1, comprising:
the session handler component executed by the data processing system to establish the communication session between the client device and the data processing system, the communication session comprising the input audio signal; and
the policy engine component executed by the data processing system to:
  determine that the content item selected via the real-time content selection process was not previously presented to the client device during the communication session; and
  instruct, responsive to the content item not previously provided during the communication session, the audio signal generator component to generate the second portion of the output signal with the second audio modulation different from the first audio modulation.

6. The system of claim 1, comprising:
the session handler component executed by the data processing system to establish the communication session between the client device and the data processing system, the communication session comprising the input audio signal and a second input audio signal; and
the content selector component to select, based on the second input audio signal, a second content item different from one or more content items previously selected and provided for the client device during the communication session;
the policy engine component executed by the data processing system to:
  determine that the second content item is different from the one or more content items previously selected and provided for the client device during the communication session;
  instruct, responsive to the second content item different from the one or more content items previously provided during the communication session, the audio signal generator component to generate a second output signal comprising a third portion corresponding to the second content item selected by the content selector component, the third portion generated with the second audio modulation; and
the interface to transmit, within the communication session and to the client device, data packets comprising the second output signal.

7. The system of claim 1, comprising:
the session handler component executed by the data processing system to establish the communication session between the client device and the data processing system, the communication session comprising the input audio signal;
the policy engine component executed by the data processing system to:
  determine that the real-time content selection process previously selected and provided one or more content items for the client device during the communication session; and
  instruct, responsive to the one or more content items previously provided during the communication session, the audio signal generator component to generate a second output signal comprising a third portion corresponding to a second content item selected by the content selector component, the third portion generated with the first audio modulation; and
the interface to transmit, within the communication session and to the client device, data packets comprising the second output signal.

8. The system of claim 7, comprising:
the session handler component executed by the data processing system to:
  detect, subsequent to transmission of the data packets comprising the second output signal, a transition from a first type of network activity that occurred in the communication session to a second type of network activity;
  terminate, responsive to the transition, the communication session; and
  establish a second communication session between the client device and the data processing system, the second communication session comprising the second type of network activity and a second input audio signal;
the policy engine component to determine that at least one content item was not previously provided in the second communication session; and
the audio signal generator component to generate a third output signal comprising a fourth portion corresponding to a third content item selected by the content selector component, the fourth portion generated with the second audio modulation responsive to the determination that at least one content item was not previously provided in the second communication session.

9. The system of claim 1, comprising:
the audio signal generator component to generate the second audio modulation comprising at least one of a frequency shift and an amplitude shift.

10. The system of claim 1, comprising:
the audio signal generator component to generate the second audio modulation comprising at least one of an audio overlay and an audio watermark.

11. The system of claim 1, comprising:
the audio signal generator component to generate the first portion with the first audio modulation comprising a default audio modulation, generate the second portion with the second audio modulation, wherein the second audio modulation comprises a frequency or amplitude greater than a frequency or amplitude of the default audio modulation.

12. A method of performing dynamic modulation of packetized audio signals, comprising:
receiving, by a natural language processor component executed by a data processing system, via an interface of the data processing system, data packets comprising an input audio signal detected by a sensor of a client device;
parsing, by the natural language processor component, the input audio signal to identify a request and a trigger keyword corresponding to the request;
establishing, by a session handler component executed by the data processing system, a communication session between the client device and the data processing system, the communication session comprising the input audio signal;
generating, by a direct action application programming interface of the data processing system, based on the trigger keyword, a first action data structure responsive to the request, the first action data structure corresponding to a first type of content;
receiving, by a content selector component executed by the data processing system, the trigger keyword identified by the natural language processor component;

selecting, by the content selector component based on the trigger keyword, a content item via a real-time content selection process, the content item corresponding to a second type of content different from the first type of content;

generating, by an audio signal generator component executed by the data processing system, an output signal comprising a first portion corresponding to the first action data structure and generated with a first audio modulation, and a second portion corresponding to the content item and generated with a second audio modulation different from the first audio modulation;

transmitting, by the interface of the data processing system, data packets comprising the output signal generated by the audio signal generator component to cause an audio driver component executed by the client device to drive a speaker of the client device to generate an acoustic wave corresponding to the output signal;

selecting, by the content selector component, for the communication session comprising the input audio signal, an additional content item via the real-time content selection process, the additional content item corresponding to the second type of content different from the first type of content;

determining, by the content selector component, that the additional content item corresponds to the content item previously selected via the real-time content selection process during the communication session;

instructing, by the content selector component, responsive to the determination that the additional content item corresponds to the content item previously selected during the communication session, the audio signal generator component to generate an additional output signal comprising an additional portion corresponding to the additional content item of the second type of content selected by the content selector component, the additional portion generated with the first audio modulation previously used to generate the first portion corresponding to the first action data structure instead of the second audio modulation previously used to generate the second portion corresponding to the content item of the second type of content; and transmitting, by the data processing system, within the communication session and to the client device, data packets comprising the additional output signal.

13. The method of claim 12, comprising:
applying, by the data processing system, a semantic processing technique to the input audio signal to identify a trigger phrase comprising the trigger keyword and a second trigger keyword.

14. The method of claim 12, comprising:
filtering, by the data processing system, the input audio signal to identify the trigger keyword.

15. The method of claim 12, comprising:
determining, by the data processing system, based on the content item selected via the real-time content selection process, to instruct the audio signal generator component to use the second audio modulation different from the first audio modulation.

16. The method of claim 12, comprising:
establishing, by the data processing system, the communication session between the client device and the data processing system, the communication session comprising the input audio signal;
determining, by the data processing system, that the content item selected via the real-time content selection process was not previously presented to the client device during the communication session; and
instructing, by the data processing system, responsive to the content item not previously provided during the communication session, the audio signal generator component to generate the second portion of the output signal with the second audio modulation different from the first audio modulation.

17. The method of claim 12, comprising:
establishing, by the data processing system, the communication session between the client device and the data processing system, the communication session comprising the input audio signal and a second input audio signal;
selecting, by the data processing system, based on the second input audio signal, a second content item different from one or more content items previously selected and provided for the client device during the communication session;
determining, by the data processing system, that the second content item is different from the one or more content items previously selected and provided for the client device during the communication session;
instructing, by the data processing system, responsive to the second content item different from the one or more content items previously provided during the communication session, the audio signal generator component to generate a second output signal comprising a third portion corresponding to the second content item selected by the content selector component, the third portion generated with the second audio modulation; and
transmitting, by the data processing system to the client device during the communication session, data packets comprising the second output signal.

18. The method of claim 12, comprising:
establishing, by the data processing system, the communication session between the client device and the data processing system, the communication session comprising the input audio signal;
determining, by the data processing system, that the real-time content selection process previously selected and provided one or more content items for the client device during the communication session;
instructing, by the data processing system, responsive to the one or more content items previously provided during the communication session, the audio signal generator component to generate a second output signal comprising a third portion corresponding to a second content item selected by the content selector component, the third portion generated with the first audio modulation; and
transmitting, by the data processing system to the client device, during the communication session, data packets comprising the second output signal.

19. The method of claim 18, comprising:
detecting, by the data processing system subsequent to transmission of the data packets comprising the second output signal, a transition from a first type of network activity that occurred in the communication session to a second type of network activity;
terminating, by the data processing system responsive to the transition, the communication session;
establishing, by the data processing system, a second communication session between the client device and the data processing system, the second communication session comprising the second type of network activity and a second input audio signal;

determining, by the data processing system, that at least one content item was not previously provided in the second communication session; and generating, by the data processing system, a third output signal comprising a fourth portion corresponding to a third content item selected by the content selector component, the fourth portion generated with the second audio modulation responsive to the determination that at least one content item was not previously provided in the second communication session.

20. The method of claim 12, comprising:

generating, by the data processing system, the second audio modulation comprising at least one of a frequency shift and an amplitude shift.

* * * * *